United States Patent
Ansari et al.

(10) Patent No.: US 8,953,432 B2
(45) Date of Patent: Feb. 10, 2015

(54) SOFTROUTER DYNAMIC BINDING PROTOCOL

(75) Inventors: Furquan Ahmed Ansari, Middletown, NJ (US); Martin Havemann, Belford, NJ (US); Tirunell V. Lakshman, Morganville, NJ (US); Thyagarajan Nandagopal, Middletown, NJ (US); Ramachandran Ramjee, Summit, NJ (US); Thomas Y. Woo, Red Bank, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 968 days.

(21) Appl. No.: 11/147,491

(22) Filed: Jun. 8, 2005

(65) Prior Publication Data

US 2006/0092857 A1 May 4, 2006

Related U.S. Application Data

(60) Provisional application No. 60/623,885, filed on Nov. 1, 2004.

(51) Int. Cl.
| | |
|---|---|
| G06F 11/00 | (2006.01) |
| H04L 12/721 | (2013.01) |
| H04L 12/751 | (2013.01) |
| H04L 12/707 | (2013.01) |
| H04L 12/703 | (2013.01) |
| H04L 12/773 | (2013.01) |

(52) U.S. Cl.
CPC ............... *H04L 45/26* (2013.01); *H04L 45/02* (2013.01); *H04L 45/22* (2013.01); *H04L 45/28* (2013.01); *H04L 45/60* (2013.01)
USPC .......................................................... 370/216

(58) Field of Classification Search
USPC .................................. 370/254, 401, 389, 216
See application file for complete search history.

(56) References Cited

U.S. PATENT DOCUMENTS

| 6,345,315 B1 | 2/2002 | Mishra |
| 6,496,503 B1 | 12/2002 | Pelissier et al. |
| 6,633,560 B1 | 10/2003 | Albert et al. |
| 6,697,329 B1 | 2/2004 | McAllister et al. |

(Continued)

FOREIGN PATENT DOCUMENTS

| EP | 1 152 631 A2 | 11/2001 |
| JP | 2000-253053 | 9/2000 |
| JP | 2002-026990 | 1/2002 |
| JP | 2003-318899 | 11/2003 |
| JP | 2003-110613 | 11/2004 |

OTHER PUBLICATIONS

L Yang et al., "Forwarding and Control Element Separation (ForCES) Framework", Apr. 2004, IETF RFC 3746.*

(Continued)

*Primary Examiner* — Omar Ghowrwal
*Assistant Examiner* — Mohammad Anwar
(74) *Attorney, Agent, or Firm* — Wall & Tong, LLP

(57) ABSTRACT

A dynamic binding protocol has three tasks that run in parallel: discovery, association, and operation. During discovery, control elements (CEs) and forwarding elements (FEs) learn about immediate neighbors and CEs in a SoftRouter network that has separate control and data planes. During association, FEs associate with CEs and are configured with basic parameters, such as IP interface addresses, hostnames, and the like. During operation, failover and packet tunneling between CEs and FEs is handled.

15 Claims, 18 Drawing Sheets

(56) References Cited

U.S. PATENT DOCUMENTS

| | | | |
|---|---|---|---|
| 6,912,197 | B2 | 6/2005 | Mahamuni |
| 7,069,343 | B2 | 6/2006 | Goringe et al. |
| 7,075,904 | B1 | 7/2006 | Manish et al. |
| 7,190,896 | B1 | 3/2007 | Wang et al. |
| 7,194,653 | B1 | 3/2007 | Hadders et al. |
| 7,197,664 | B2 * | 3/2007 | Khosravi .................. 714/12 |
| 7,286,468 | B2 | 10/2007 | Scudder et al. |
| 7,324,439 | B2 | 1/2008 | Loo |
| 7,353,259 | B1 | 4/2008 | Bakke et al. |
| 7,428,219 | B2 | 9/2008 | Khosravi |
| 8,068,408 | B2 | 11/2011 | Ansari et al. |
| 2002/0191250 | A1 | 12/2002 | Graves et al. |
| 2003/0028641 | A1 | 2/2003 | Zhang et al. |
| 2003/0069975 | A1 | 4/2003 | Abjanic et al. |
| 2003/0208585 | A1 | 11/2003 | Shinomiya et al. |
| 2004/0131079 | A1 | 7/2004 | Hegde et al. |
| 2004/0264384 | A1 | 12/2004 | Deval et al. |
| 2005/0050136 | A1 | 3/2005 | Golla |
| 2005/0190783 | A1 * | 9/2005 | Khosravi .................. 370/438 |
| 2005/0254438 | A1 | 11/2005 | Turk et al. |
| 2008/0165686 | A1 | 7/2008 | Lake et al. |
| 2012/0239626 | A1 | 9/2012 | Aysan et al. |

OTHER PUBLICATIONS

J. Moy, "OSPF Version 2", Apr. 1998, IETF RFC 2328.*
R Gopal et al., "ForwArding and Control ElemenT protocol (FACT)", Nov. 2003, IETF Draft (draft-gopal-forces-fact-06.txt).*
Learning Guide. "Introduction to Micro Computers Module I"., ComputerPREP, Inc. 1999. pp. 24-30.*
A. Lazar, "Programming Telecommunication Networks," IEEE Network, vol. 11, Sep./Oct. 1997, pp. 8-18.
S. Williams, "The Softswitch Advantage," IEE Review, vol. 48, Issue 4, Jul. 2002, pp. 25-29.
J. Rexford et al., "Network-Wide Decision Making: Toward A Wafer-Thin Control Plane," HotNets, 2004.
L. Yang et al., "Forwarding and Control Element Separation (ForCES) Framework," RFC 3746, 2004.
U.S. Appl. No. 11/147,642, filed Jun. 8, 2005, Lakshman et al.
U.S. Appl. No. 11/147,472, filed Jun. 8, 2005, Ansari et al.
U.S. Appl. No. 11/147,665, filed Jun. 8, 2005, Ansari et al.
U.S. Appl. No. 11/147,937, filed Jun. 8, 2005, Lakshman et al.
U.S. Appl. No. 11/147,768, filed Jun. 8, 2005, Lakshman et al.
Search Report in corresponding EP 05 25 6627, Jan. 18, 2006, Lucent Technologies Inc.
Doria (Co-Editor) ETRI A: "ForCES Protocol Specification" IETF Standard-Working-Draft, Internet Engineering Task Force, IETF, CH, vol. forces, No. 1, Oct. 25, 2004, XP015018475 ISSN: 0000-0004 chapters 3.2, 6.2, chapter 8.
Furquan Ansari Thyaga Nandagopal Lucent Tech Hormuzd Khosravi Intel Corp: "ForCES Element Bindings and Topology Discovery protocol" IETF Standard-Working Draft, Internet Engineering Task Force, IETF, CH, Jul. 10, 2004, XP015010189 ISSN:0000-0004 chapters 2.1, 3.
Alex Audu Alcatel USA Inc RAM Gopal Nokia Hormuzd Khosravi Intel Chaoping Wu Azanda Network Devices: "Forwarding and Control Element protocol (FACT)" IETF Standard-Working-Draft, Internet Engineering Task Force, IETF, CH, No. 6, Nov. 2003, XP015013712 ISSN: 0000-0004 chapter 5.1 chapter 7.3.
R et al: "Pre Association Phase protocol (PAP) draft-nait-forces-pap-00.txt" IETF Standard-Working-Draft, Internet Engineering Task Force, IETF, CH, Jun. 2003, XP015004535 ISSN: 0000-0004 Chapter 4.
Gopal, Ram, "Seperation of Control and Forwarding Plane Inside a Network Element," High Speed Networks and Multimedia Communications, 5$^{th}$ IEEE International Conference. Nov. 7, 2002. pp. 161-166.
Chan, Viet et al., "Control Plane Platform Development Kit (CP-PDK)—Integrating Control Plane and Data Plane," Intel Corporation. Feb. 19, 2003.
Louati, Wajdi et al., "Configurable Software-Based Edge Router Architecture," 4$^{th}$ Workshop on Applications and Services in Wireless Networks. Aug. 2004.
Forwarding and Control Element Separation (ForCES) Framework, RFC 3746 by Yang et al. Apr. 30, 2004.
L. Yang et al., "Forwarding and control Element Separation (ForCES) Framework", Network Working Group Request for Comments: 3746, Apr. 2004.
Ansari et al., "element Bindings and Topology discovery Protocol—(Slides)".
Lin et al., "Multihop Wireless IEEE 802.11 LANs", 1999 IEEE Int Conf., vol. 3, pp. 1568-1572.
Ram Gopal, "Separation of Control and Forwarding Plane Inside a Network Element", 2002 IEEE.
Furquan Ansari et al., "ForCES Element Bindings and Topology Discovery Protocol", Jul. 2004.
V. Chan et al., "Control Plane Platform Development Kit," Intel Developer Forum, Spring 2003.
Tal Lavian et al. "intelligent network services through active flow manipulation" Intelligent Network Workshop, 2001 IEEE May 6-9, 2001, Piscataway, NJ, USA, IEEE, May 6, 2001, pp. 73-82.
RFC 3654 ForCES Requirements, Khosravi et al., Nov. 2003.
Nov. 10, 2010 Office Action in JP 2005-318015, Alcatel-Lucent USA Inc., Applicant, 3 pages.
Nov. 22, 2010 Office Action in JP 2005-318066, Alcatel-Lucent USA Inc., Applicant, 4 pages.
"Draft Exploration Party" Computer & Network LAN published by Ohm Publisher, on May 1, 2003, vol. 21, No. 5, pp. 75-78.
Apr. 26, 2012 Office Action in KR 10-2005-0102888, Alcatel-Lucent USA Inc., Applicant, 5 pages.
Yang et al., RFC3746, "Forwarding and Control element Separation (ForCES) Framework," Apr. 2004, Forces Working Group (Apr. 2004), http://tools.ietf.org/rfc/rfc3746.txt.
Khosravi et al., RFC 3654 ForCES Requirements, Nov. 2003.
Oct. 16, 2012 Office Action in JP 2005-317886, Alcatel-Lucent USA Inc., Applicant, 5 pages.
Aug. 5, 2011 Office Action in JP 2005-317886, Alcatel-Lucent USA Inc., Applicant, 2 pages.
Oct. 26, 2010 Office Action in JP 2005-317886, Alcatel-Lucent USA Inc., Applicant, 3 pages.
Watanabe, et al., "Method of constructing a backbone architecture of next-generation computer network", pp. 435-444, published on Apr. 10, 1998 by Telecommunication Association, NTT R&D vol. 47, No. 4.
May 9, 2012 Office Action in KR 10-2005-0104005, Alcatel-Lucent USA Inc., Applicant, 4 pages.
Apr. 6, 2012 Office Action in KR-10-2005-0102998, Alcatel-Lucent USA Inc., Applicant, 4 pages.
Ansari, et al., Element Bindings and Topology Discovery Protocol—(Slides), 11 pages, May 20, 2009.
Lin et al., Multihop Wireless IEEE 802.11 LANs: A Prototype Implementation, IEEE int. Conf., vol. 3, 7 pages, Aug. 17, 2000.
"IPv6 Unicast Forwarding Service API Implementation Agreement, Revision 2.0" Network Processing Group, 'Online May 26, 2004, pp. 1-11, XP002362393 Retrieved from the Internet: URL:HTTP://www.npforum.org/techinfo/IPv4-IA.pdf>'retrieved on Jan. 11, 2006.
Jun. 17, 2013 Office Action in IN Application No. 1577/CHE/2005, Lucent Technologies Inc., Applicant, 3 pages.
Jun. 4, 2013 Office Action in IN Application No. 1581/CHE/2005, Lucent Technologies Inc., Applicant, 3 pages.
Jun. 20, 2013 Office Action in IN Application No. 1583/CHE/2005, Alcatel-Lucent, Applicant, 3 pages.
Jul. 23, 2013 Office Action in IN Application No. 1578/CHE/2005, Alcatel-Lucent, Applicant, 2 pages.
Gregersen, Kristian, NPF Network Processing Forum, IPv6 Unicast Forwarding Service API Implementation Agreement, Revision 2, Copyright 2004, 116 pages; retrieved from the internet http://www.oiforum.com/public/documents/IPv6-Rev2_IA.pdf on Aug. 21, 2013.
Jul. 16, 2013 Appeal Examiner's Refusal Decision in JP 2005-317886, Alcatel-Lucent USA Inc., Applicant, 14 pages.

\* cited by examiner

TRADITIONAL ROUTER-BASED NETWORK

HELLO
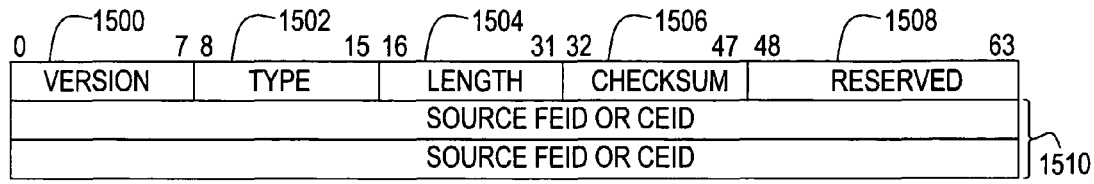
FIG. 15
SOLICITATION
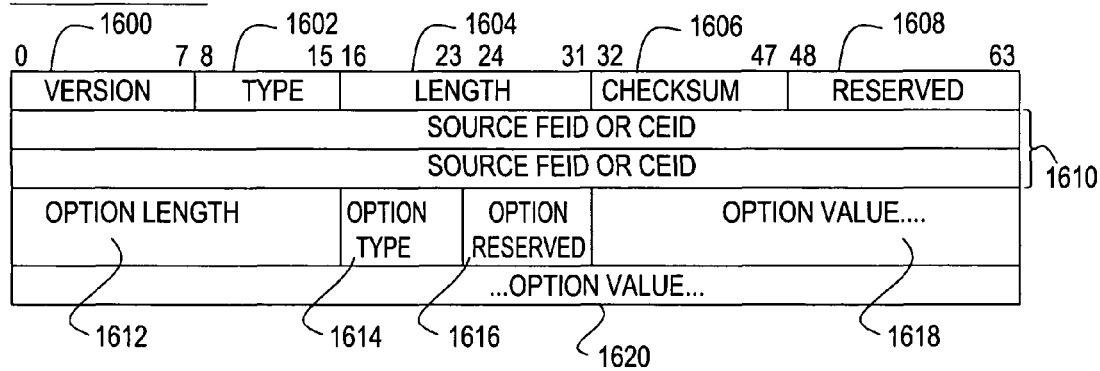
FIG. 16
TLV DEFINITIONS
| OPTION TYPE | OPTION LENGTH | OPTION VALUE |
|---|---|---|
| 0 | 32 OR 128 | ADDITIONAL LAYER 3 IDENTIFIER |
| 1 | 128 | CEID WITH WHICH FE DESIRES TO ASSOCIATE |
| 2 | 128 | LAST ASSOCIATED CEID |
FIG. 17

SOFTROUTER DYNAMIC BINDING PROTOCOL

CROSS-REFERENCES

The present application claims the benefit of provisional application No. 60/623,885, entitled "SoftRouter: Router Disaggregation," filed Nov. 1, 2004. In addition, the present application is related to copending applications Ser. No 11/147,642, entitled "SoftRouter," Ser. No. 11/147,472, entitled "SoftRouter Protocol Disaggregation," Ser. No. 11/147,665, entitled "SoftRouter Protocol Failovers," Ser. No. 11/147.937, entitled "SoftRouter Separate Control Network," Ser. No. 11/147,768, entitled "SoftRouter Feature Server," which were filed on the same date as the present application, Jun. 8. 2005. The provisional and related applications are incorporated herein by reference in their entireties.

FIELD OF THE INVENTION

The present invention relates generally to the field of networking and, in particular, relates to a dynamic binding protocol in an exemplary SoftRouter architecture.

BACKGROUND OF THE INVENTION

Traditional router architectures are becoming increasingly complex today as more and more features are being added to the Internet control plane. Many operational tasks such as routing policy enforcement or traffic engineering require network-wide control that is difficult and cumbersome to achieve in a network of autonomous and complex routers. Moreover, current routers have the route controllers tightly coupled with the forwarding engine and this static binding often results in shared failures.

Despite the end-to-end architecture design principle that aims at a simple core network, traditional router architectures have gotten increasingly complex today. As new features are being defined by the Internet Engineering Task Force (IETF) in requests for comments (RFCs), more and more control plane complexity is being added at the routers. These features include routing (e.g., BGP-based MPLS-VPNs), traffic engineering (e.g., OSPF-TE), security, and the like. In fact, the code complexity of an IP router now rivals that of a telephony switch. In contrast, the forwarding path implementation has progressively become easier with rapid advances in large-scale hardware integration (e.g., ASIC) and ready availability of off-the-shelf chips.

Traditional IP networks are constructed using routers that operate relatively autonomously. The potentially unmanageable complexity is present at many points all over the network. This has many undesirable consequences. First, the multiple points of control significantly increase operational complexity (e.g., misconfiguration). Second, in certain circumstances, uncoordinated actions of these autonomous routers can lead to sub-optimal performance (e.g., poor recovery time) at best and network instability in the worst case. Finally, the introduction of new features may require upgrades to a large number of routers, which is both complex and error-prone.

Traditional router architectures have integrated control and forwarding. The control processors implementing control plane functions are co-located with the line cards that implement forwarding functions and often share the same router backplane. The control processors provide control functions only to the co-located line cards, and vice-versa, leading to a scenario where the line cards cannot be managed when there is a failure of the co-located controller(s).

SUMMARY

Various deficiencies of the prior art are addressed by the present invention of a dynamic binding protocol for an exemplary SoftRouter architecture, which has many embodiments.

One embodiment is a dynamic binding protocol process, where forwarding element (FE) to control element (CE) communication paths are dynamically established and traffic transport is controlled for a network. The network includes a data plane and a control plane that are physically and logically separate. The data plane includes a plurality of FEs for packet forwarding. The control plane includes a plurality of CEs for configuring, controlling, and providing routing information to the FEs via a standard protocol. Another aspect is a storage medium storing instructions for performing this method.

Yet another embodiment is a network architecture, including a data plane and a control plane that are physically and logically separate. The data plane includes a plurality of FEs for packet forwarding. The control plane includes at least one CE for configuring, controlling, and providing routing information to the FEs via a standard protocol. There is a dynamic binding protocol for establishing FE-to-CE communication paths and controlling traffic transport. The dynamic binding protocol has a discovery task, an association task, and an operation task.

Yet another embodiment is a dynamic binding protocol process. FEs and CEs send periodic hello neighbor messages. FEs and CEs send periodic solicitation messages. CEs send advertisement messages in response to the solicitation messages. FEs send reachability messages in response to the solicitation messages. FEs aggregate and propagate the advertisement and reachability messages. FEs associate with CEs so that each FE has associated CEs controlling it. CEs configure the controlled FEs.

Yet another embodiment is a dynamic binding protocol process including booting a control element (CE) to bring it from a down state to an up state. The CE receives solicitation messages. The CE propagates its identity though advertisement messages. It is determined whether the CE is associated with any forwarding elements (FEs) and, if so, the CE controls them.

Still another embodiment is a dynamic binding protocol process including booting a forwarding element (FE) to bring it from a down state to an up state. The FE receives a control element (CE) or FE solicitation message and responds to the CE or FE solicitation message by propagating CEs in reachability messages. The FE responds by requesting an association, after collecting a set of CEs. The FE receives an association acceptance from the CE. The FE sends heartbeat message to the associated CE and receives heartbeat acknowledgement messages from the associated CE.

Still another embodiment is a dynamic binding protocol process including receiving solicitation messages and responding to the solicitation messages by propagating CEs in reachability messages and by requesting an association, after collecting a set of CEs. An FE receives an association acceptance from a CE and is controlled by that CE. The FE responds to the association acceptance by requesting an activation and receives an activation response from the CE. The FE sends an activation request to a backup CE, upon failure of the associated CE and receives an activation acknowledgement from the backup CE and is then controlled by the backup CE.

BRIEF DESCRIPTION OF THE DRAWINGS

The teachings of the present invention can be readily understood by considering the following detailed description in conjunction with the accompanying drawings, in which:

FIG. 15 is a diagram showing an exemplary layout for a neighbor hello message;

FIG. 16 is a diagram showing an exemplary layout for a solicitation message;

FIG. 17 is a table showing type, length, value (TLV) definitions for the option type field;

DETAILED DESCRIPTION OF THE INVENTION

The invention will be primarily described within the general context of an embodiment of an exemplary SoftRouter architecture, however, those skilled in the art and informed by the teachings herein will realize that the disaggregation concept may be used to generate various other embodiments of network architectures and that the invention is applicable to local area networks (LANs), metropolitan area networks (MANs), wide area networks (WANs), and other networks, many open systems interconnection (OSI) layers, gateway protocols, serial line protocols, protocol stack routing and bridging protocols, many other protocols, traffic management, optical, edge/core routing, wireless, cable, data centers, auxiliary signal path (ASP), fault management, configuration management, accounting management, performance management, security management, other network management, enterprise, government, military applications, and many other different kinds of networking characteristics and applications.

Figure 1:
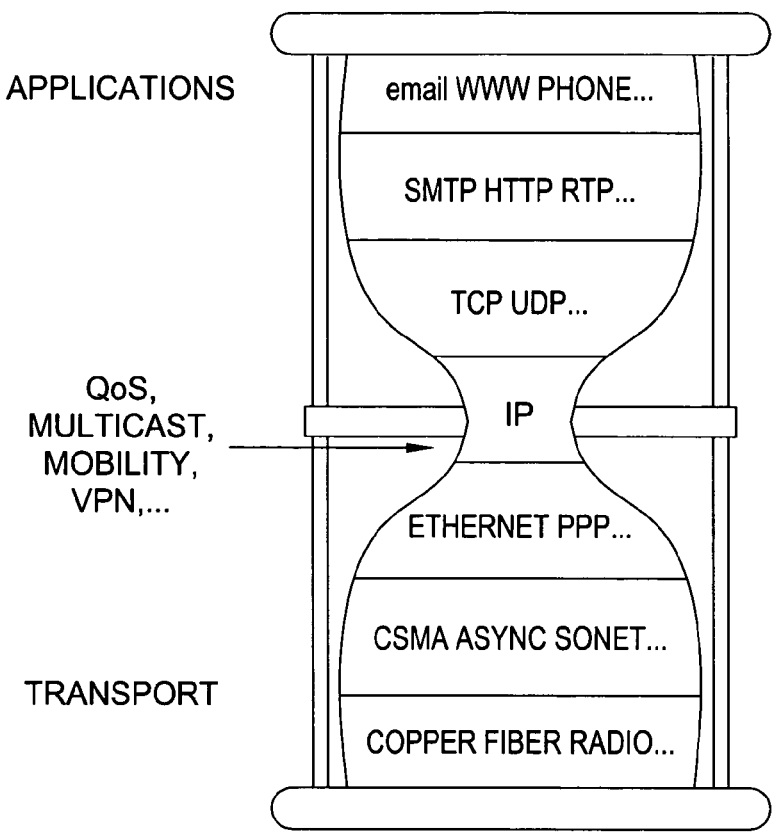
FIG. 1 illustrates the problem of emerging applications driving more functions to IP.

Internet protocol (IP) provides end-to-end datagram delivery service to protocols and applications and can use many different link-layer technologies to deliver packets. FIG. 1 illustrates the problem of emerging applications requiring more functions of the IP layer, expanding the middle of the hour glass. These emerging applications include email, www phone, simple mail transfer protocol (SMTP), hypertext transfer protocol (HTTP), routing table protocol (RTP), transmission control protocol (TCP), user datagram protocol (UDP), and other protocols, which involve quality of service (QoS), multicast, mobility, virtual private network (VPN), and other features and are transported using Ethernet, point-to-point protocol (PPP), carrier sense multiple access (CSMA), ASYNC (a subset of teletypewriter (TTY)), synchronous optical network (SONET), and other protocols over copper, fiber, radio, and other physical transport means. Traditional router architectures try to incorporate all of the new IP functions into routers, resulting in duplication of complex functions in multiple routers of a network. This also increases capital and operational expenses. In general, there is a need to reduce the complexity and expense of operating a network of routers.

Many new features are being added to routers, e.g. border gateway protocol (BGP), multiprotocol label switching (MPLS)-based VPNs, and traffic engineering (TE). Traditional router architectures have five to ten million lines of code and complexity is spread throughout the network. Achieving an operator's network-wide objectives, such as traffic engineering requires complex translation of global objectives to configuration information in numerous individual routers. Misconfiguration or uncoordinated configuration can result in poor performance or network instability.

The enormous success of the Internet has led to constant development and deployment of new features and services that have increasingly placed its technical foundations under stress. This has given credence to the notion that re-architecting the current distribution of functions in an IP network would lead to significant benefits in network stability, simplification of network operations, and flexibility in introduction of new network protocols and services.

Many advanced network management tasks, such as routing policy enforcement and traffic engineering would benefit significantly from the availability of a network-wide view. For instance, several common BGP-induced network stability and operations problems would be solved by moving BGP from a group of individual routers to a single entity with autonomous system (AS)-wide scope. Similarly, many management functions require a network-wide view, without which a network can exhibit oscillation and poor stability. However, network-wide control is difficult and cumbersome to achieve in today's network of autonomous and complex routers.

In the traditional router architectures, the underlying theme is the deep intertwining of control and forwarding functions in current routers. There is a need to deconstruct routers to keep most of the network entities as dumb as possible by reducing their function to support only a few canonical packet forwarding functions and migrate all control protocols and non-forwarding related state and control processing to a few smart network-based control entities with the primary function of network-wide control. Such a deconstructed router benefits from a dynamic binding protocol for binding control elements and forwarding elements.

Definitions $T_{discover}$ is the predetermined time interval between hello neighbor messages from a FE or a CE.

$T_{collect}$ is the predetermined time the FE discovers and collects CEs.

$T_{solicit}$ is the predetermined time interval between solicitation messages from a FE or a CE.

$T_{expiry}$ is the predetermined time-to-live for an entry in the CE table.

$T_{associate}$ is the predetermined timeout value for associate request messages.

$T_{configure}$ is the predetermined timeout value for configure messages.

$T_{activate}$ is the predetermined timeout value for activation messages.

$T_{heartbeat}$ is the predetermined time interval between heartbeat messages between a FE and a CE.

$W_{path}$ is the predetermined number of waiting periods of $t_{heartbeat}$ until the path to the CE is declared down.

$W_{discover}$ is the predetermined number of waiting periods of $t_{discover}$ until the link to a neighboring FE is declared down.

$R_{associate}$ is the predetermined number of retries to associate with a CE before switching to the next CE.

$R_{configure}$ is the predetermined number of retries to obtain a configuration from a CE before switching the next CE.

$R_{activate}$ is the predetermined number of retries to activate the backup CE.

Disaggregation of router hardware from router software using open, standards-based protocols for internetworking has many benefits. The disaggregation concept decouples suppliers for each component, which lowers barriers to entry for hardware vendors and encourages independent software vendors (ISVs) to invest in developing carrier-class routing software to supply new hardware market entrants. This disaggregation concept allows each component to focus on its own innovation curve. Hardware manufacturers can focus on the highest speeds per density at the lowest costs, decreasing capital expenditures and software manufacturers can focus on new applications and manageability, increasing revenue while decreasing operating expenses.

An embodiment of an exemplary SoftRouter architecture deconstructs routers by separating the implementation of control plane functions from packet forwarding functions. Other embodiments of network architectures that achieve this deconstruction are also within the scope of this invention. The present invention encompasses the concept of this deconstruction and its implications for network architecture. In the exemplary SoftRouter architecture, all control plane functions are implemented on separate control entities that are not required to be co-located with the forwarding engines. By migrating all non-forwarding related state and control processing to a few network-based control entities, simpler implementation of network-wide objectives are possible, because coordinated configuration changes are required at only a few smart network elements, instead of all the network elements in an AS. In addition, the association between controllers and the forwarding engines is dynamic, allowing flexible control of a forwarding engine by any control entity that is capable of doing so.

The exemplary SoftRouter architecture includes a dynamic binding protocol for establishing and maintaining dynamic bindings between forwarding entities and the control entities in the network. Intra-domain and inter-domain routing is adapted in the exemplary SoftRouter architecture with improved performance, including improved performance for the intra-domain protocol OSPF.

Disaggregation of router hardware from router software using open, standards-based protocols for internetworking has many benefits. The disaggregation concept decouples suppliers for each component, which lowers barriers to entry for hardware vendors and encourages independent software vendors (ISVs) to invest in developing carrier-class routing software to supply new hardware market entrants. This disaggregation concept allows each component to focus on its own innovation curve. Hardware manufacturers can focus on the highest speeds per density at the lowest costs, decreasing capital expenditures and software manufacturers can focus on new applications and manageability, increasing revenue while decreasing operating expenses.

An exemplary embodiment of an exemplary SoftRouter architecture is an approach to disaggregating the complex router functions demanded by emerging applications. SoftRouter centralizes and allows sharing of complexity. SoftRouter enables scalable introduction of new functions without unduly encumbering IP forwarding functions.

Figure 2:
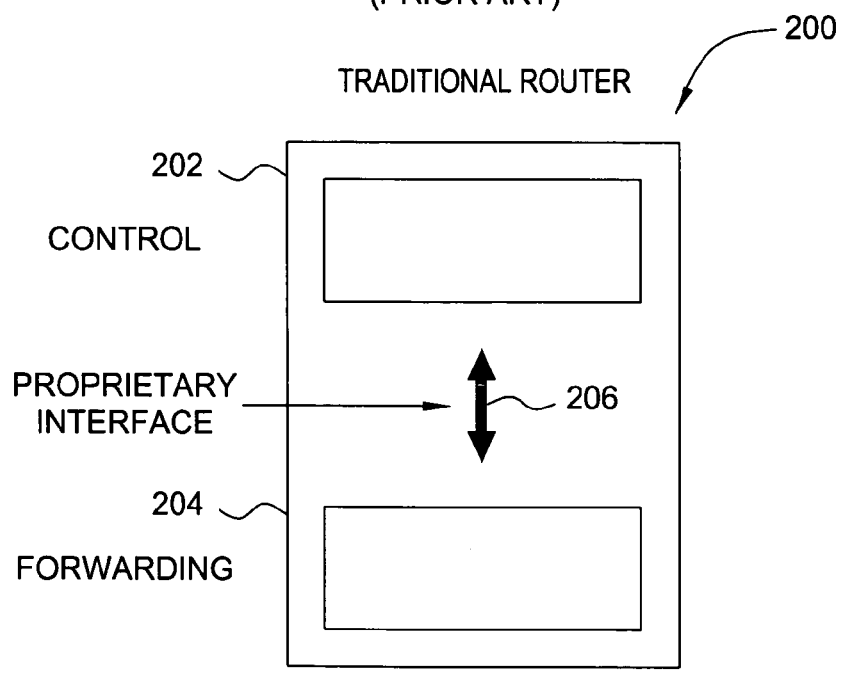
FIG. 2 is a block diagram showing a traditional router.

FIG. 2 shows a traditional router 200 having integrated control and transport planes. The traditional router 200 has control 202 and forwarding 204 sharing hardware and communicating through a proprietary interface 206.

Figure 3:
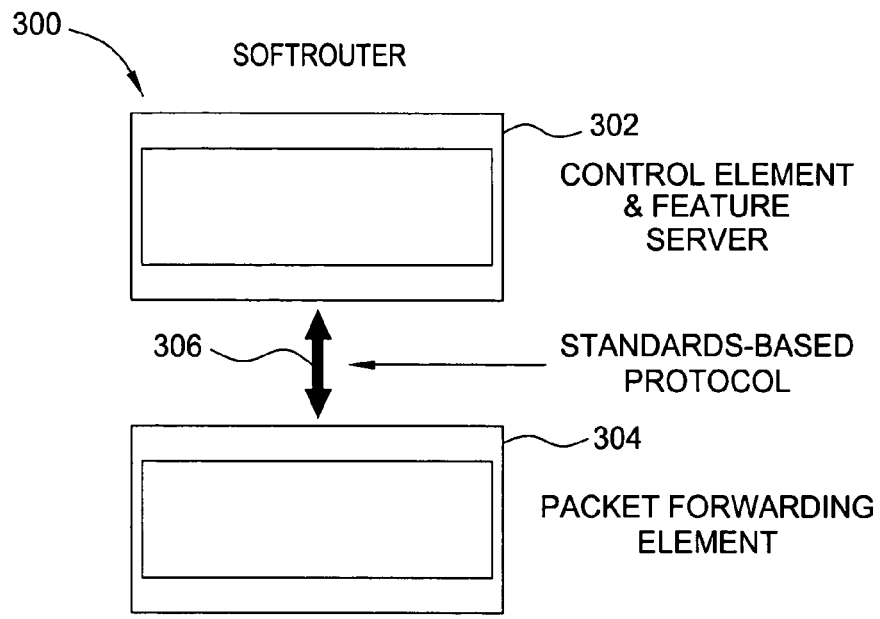
FIG. 3 is a block diagram showing a high level abstraction of an exemplary SoftRouter architecture.

By contrast, FIG. 3 shows a high level abstraction of an exemplary SoftRouter architecture 300 that disaggregates the control and transport planes in separate hardware that communicate using standard protocols. The SoftRouter architecture 300 has a control element and features server component 302 and a packet forwarding element component 304 that communicate using a standards-based protocol 306.

Figure 4:
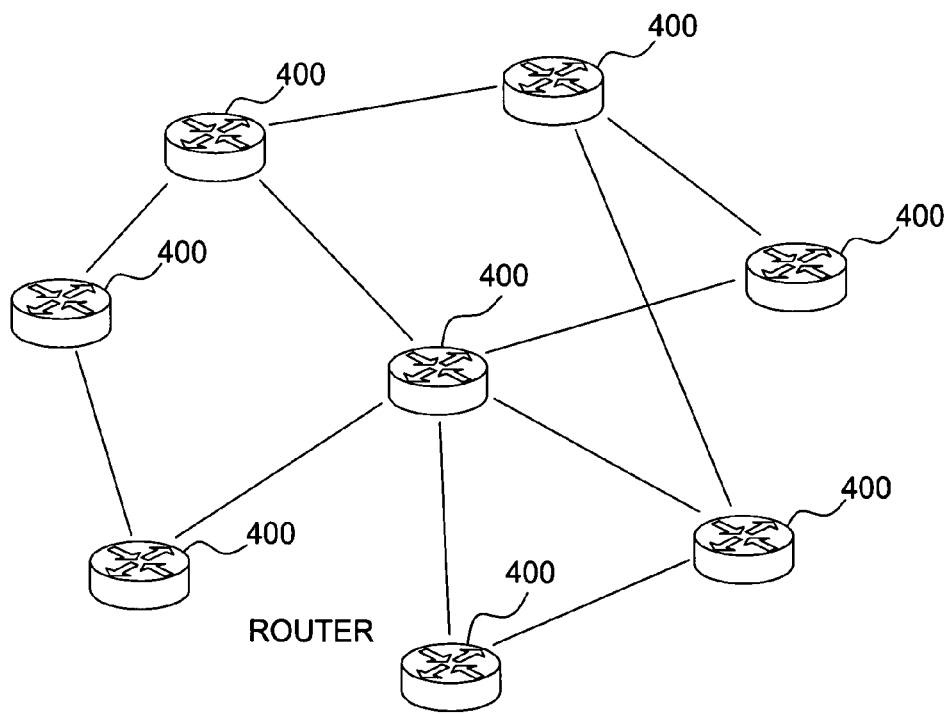
FIG. 4 is a block diagram showing a traditional router architecture.

FIG. 4 shows the traditional router architecture, which has a number of interconnected routers 400.

Figure 5:
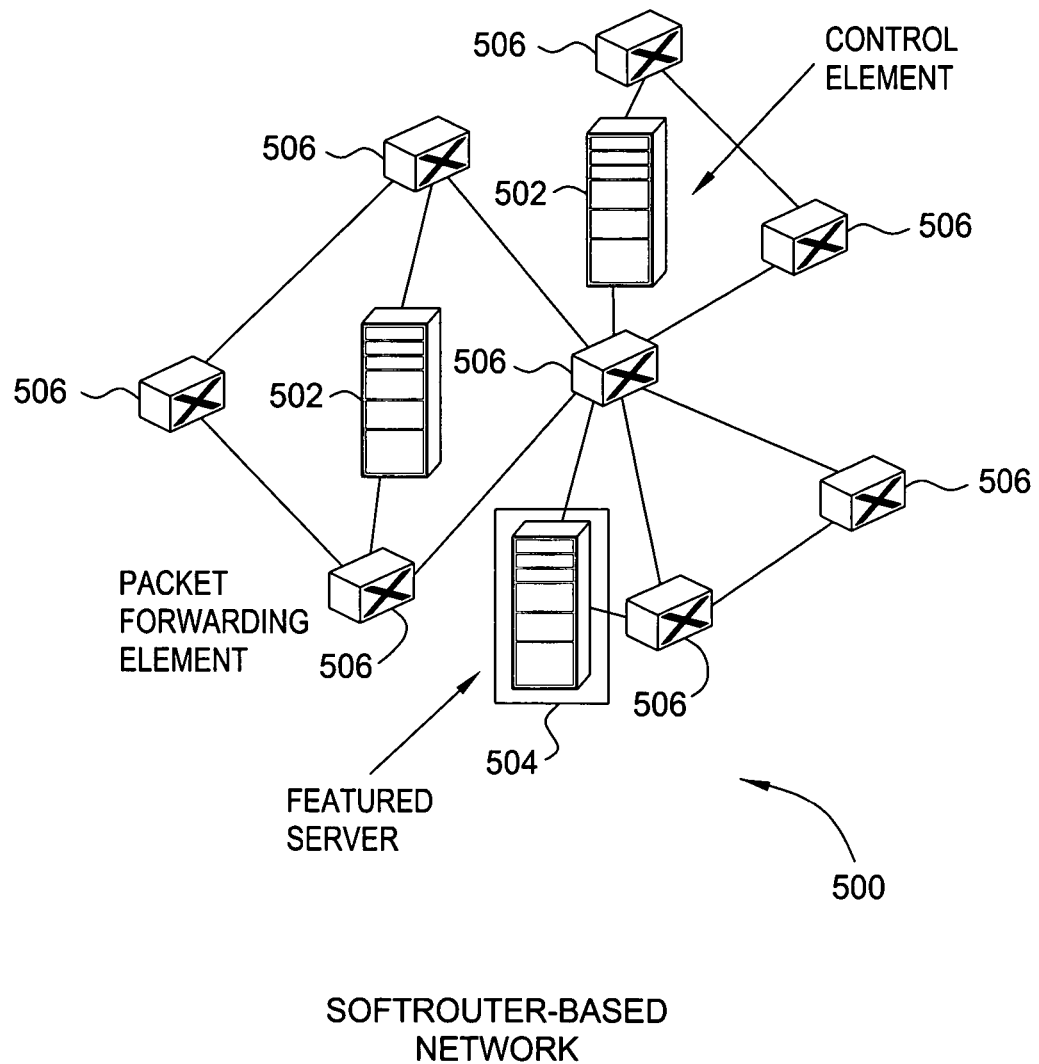
FIG. 5 is a block diagram showing an embodiment of the exemplary SoftRouter architecture.

FIG. 5 shows an embodiment of the exemplary SoftRouter architecture 500. In this embodiment of the exemplary SoftRouter architecture 500, the software servers include control elements (CEs) 502 and feature servers (FSs) 504. CEs 502 are responsible for traditional routing, e.g., for both interior gateway protocol (IGP) (e.g., open shortest path first (OSPF)) and exterior gateway protocol (EGP) (e.g., border gateway protocol (BGP)). FSs 504 are responsible for value-added functions and network-based applications, e.g., QoS, VPN, and mobile IP. Both CEs 502 and FSs 504 interface to forwarding elements (FEs) 506. CEs 502 and FSs 504 may have additional interfaces to each other. The exemplary SoftRouter architecture separates and centralizes the software-based route controller (SoftRouter) from hardware-based transport and packet forwarding.

Deconstructing routers in the exemplary SoftRouter architecture separates the control and forwarding functions. This separation is more than logical (e.g., the use of a well-defined interface with a modular application programming interface (API)); in fact, the control is physically separated (i.e., executed in a distinct network element) by multiple hops from where the forwarding is performed.

A FE 506 is a network element that performs the actual forwarding and switching of traffic. In construction, a FE 506 is similar to a traditional router in that it may have multiple line cards, each in turn terminating multiple ports, and a switch fabric for shuttling data traffic from one line card to another. However, a FE 506 is different from a traditional router, because there is an absence of any sophisticated control logic (e.g., a routing process like OSPF or BGP) running locally. Instead, the control logic is hosted remotely.

A CE 502 is a general purpose computing element, such as a server. It connects to the network like an end host, except that it is typically multi-homed to the network via multiple FEs 506, so that it is not disconnected from the network when a single link fails. A CE 502 runs the control logic on behalf of FEs 506 and, hence, controls them. Any control logic typically found on a traditional router can be migrated to the CEs 502, including routing protocols like OSPF and BGP as well as protocols such as resource reservation protocol (RSVP), label distribution protocol (LDP), Mobile IP, and the like.

An FE 506 functions to forward data traffic between its links. This function may take various forms, such as packet forwarding, label switching, and optical switching, among others. Packet forwarding includes both layer 2 (medium access control (MAC)-based switching) and layer 3 (longest-prefix match) forwarding. Label switching includes, for example, MPLS forwarding. The data-path forwarding functions can include label-swapping, pushing, and popping. In optical switching, the traffic can be time-switched, wavelength-switched, or space-switched among the links. In each of these cases, the switching function is driven by a simple local table that is computed and installed by a CE 502 in the network. Thus, the ability of a FE 506 to do its work based only on a local data structure means the FE 506 is designed to be dumb and fast, while the more complex logic is relegated to a remote, yet smart CE 502.

Both FEs 506 and CEs 502 are understood as logical entities, in addition to physical network elements. Specifically, a FE 506 is logically defined as a collection of ports where traffic can be switched among one another. For example, a FE 506 may include all ports on a single line card, in which case the whole physical packet switch is made up of multiple logical FEs 506. An FE 506 can also span more than one physical switch; however a CE can control multiple FEs. Similarly, a CE 502 can be understood as a logical process instantiated for providing control on behalf of FEs and can be distinguished from the server machine that actually executes it. In particular, a physical CE server machine (PCE) can host multiple CE 502 processes, each serving a different collection of FEs 506. Vice-versa, it is also possible for multiple CE 502 processes (each instantiated for a different control purpose such as interior gateway protocol (IGP) and exterior gateway protocol (EGP)) serving the same FE 506 to be hosted on distinct PCEs. The physical and logical definitions of FEs 506 and CEs 502 are used interchangeably.

Figure 6:
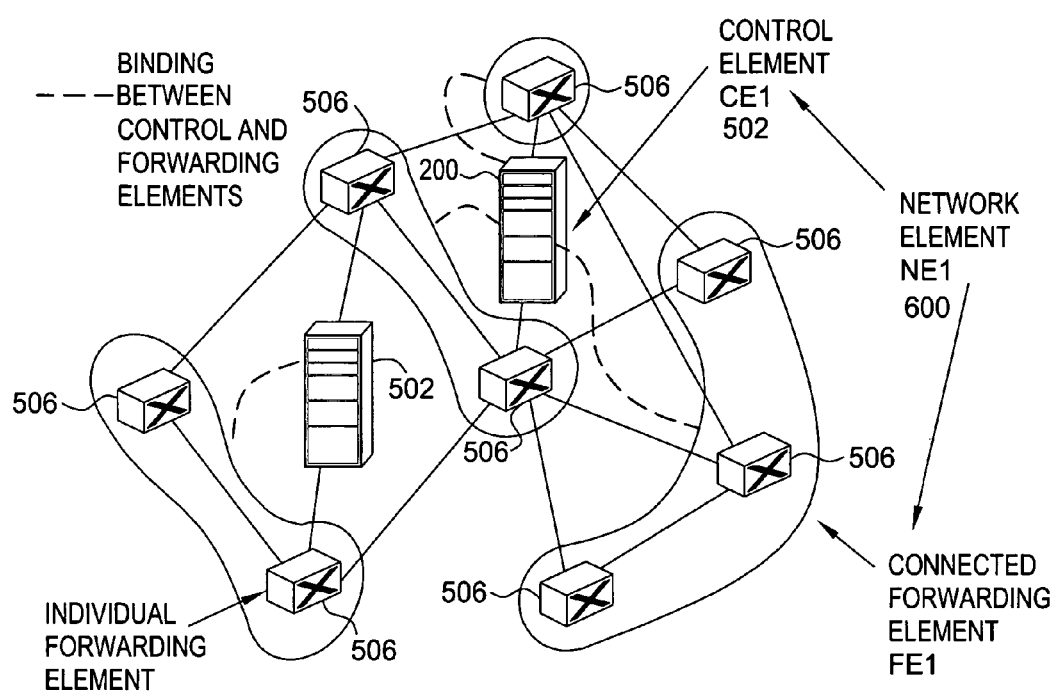
FIG. 6 is a block diagram showing an embodiment of the exemplary SoftRouter architecture illustrating network elements.

FIG. 6 shows an embodiment of the exemplary SoftRouter architecture illustrating network elements 600. Although the notion of a router is not strictly needed in the exemplary SoftRouter architecture, it is useful to regain some equivalent notion in order to understand the routing view of a network. To this end, the concept of a network element (NE) 600 is defined at a high level as a logical grouping of FEs 506 and the respective CEs 502 that control those FEs 506. A particular NE 600 grouping implicitly classifies each link between FEs as either internal (or intra-NE) or external (or inter-NE). An internal link connects two ports belonging to the same NE 600 and an external link connects two ports belonging to different NEs 600. The concept of NE 600 is useful when intra-NE and inter-NE routing follow different approaches.

Without additional restrictions, the above definition of NE 600 allows flexibility. For example, this definition allows two FEs 506 in disjoint parts of a network to belong to the same NE 600. It also allows for a traditional router model where the FE 506 includes exactly all the ports in the physical element and the controlling CE(s) 502 are collocated on the same element.

In clustered routing, the FEs 506 making up a NE 600 are part of a contiguous cloud. In other words, all ports of the NE 600 are reachable from each other via links internal to the NE 600. Physically, this represents the clustering of neighboring physical FEs 506 into a single NE 600. A typical scenario is that of several routers being connected back-to-back in a central office. From a routing perspective, this clustering-based definition of the NE 600 can provide significant simplification. The reduced number of NEs 600 in the routing view reduces the inter-NE routing complexity and a different, possibly less complex routing protocol can be employed for intra-NE routing.

The control relationship between an FE 506 and a CE 502 is formally called a binding. More precisely, a binding between a FE 506 and a CE 502 means that the CE 502 is performing particular control functions on behalf of the FE 506. Because multiple protocols (e.g., IGP and EGP, or even multiple instances of a protocol) may be required for the operation of a FE 506, a FE 506 may have multiple CE 502 bindings.

The exemplary SoftRouter architecture includes various protocols. A number of different protocols are used for the operation of a network designed according to the exemplary SoftRouter architecture, including dynamic binding protocol and FE/CE transport protocol. The binding between a FE 506 and a CE 502 is established via a protocol that discovers CEs 502 and FEs 506 and also maintains these bindings in the face of network disruptions. In the most general case of the dynamic binding protocol, an FE 506 can bind to any available CE 502 and a CE 502 can perform control functions for any FE 506, thus yielding maximal resiliency and minimal configuration overhead. This dynamic binding ability is a feature of the concept of deconstructed routers that have separate control and forwarding functions. The FE/CE transport protocol has two parts, namely data and control. For the data part, the FE/CE transport protocol supports tunneling of routing protocol packets between FEs 506 and CEs 502 so that a routing protocol packet received by an FE 506 can be sent to a CE 502 for processing. For the control part, once a binding is established, the FEs 506 and the CEs 502 use the FE/CE transport protocol to communicate state information and perform control. On the uplink (FE 506 to CE 502) direction, this control part provides link and forwarding state information (e.g., link up/down signal) to the CE 502. On the downlink direction, the FE/CE transport protocol carries configuration and control information (e.g., enable/disable a link, forwarding information base (FIB)). Known protocols, such as forwarding and control element separation (ForCES) may be used for the FE/CE transport protocol.

An exemplary embodiment of the dynamic binding protocol establishes forwarding element (FE) to control element (CE) communication paths and controls traffic transport. When a FE boots, routing is not available and FEs are only configured with a unique identifier (FEID). Each FE discovers its CEs and initiates communication to allow higher layer applications, such as open shortest path first (OSPF) to install routes. The FE-to-CE communication path is monitored and switched to a backup-CE in case of a failure. Each CE is identified through its unique identifier (CEID). This exemplary dynamic binding protocol is Internet protocol (IP) routing independent. This exemplary dynamic binding protocol also acts as a fallback protocol to allow CE-to-FE control communication, for example, when a regular routing failure leaves a FE unreachable.

Figure 7:
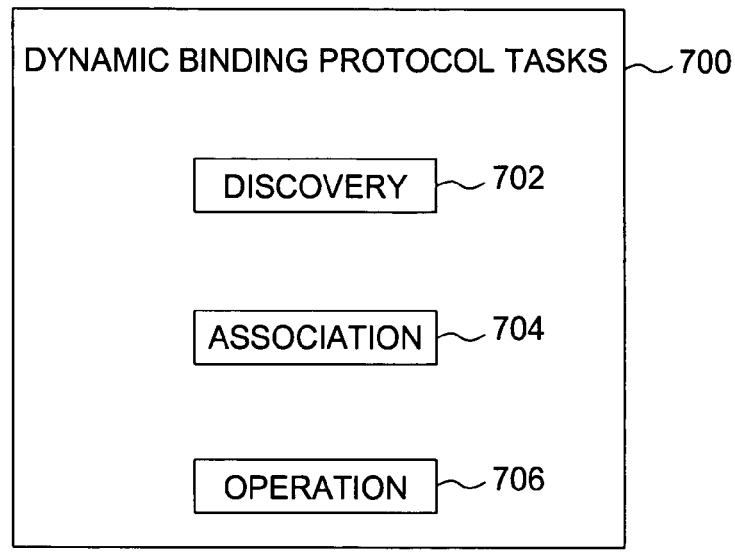
FIG. 7 is a diagram showing an embodiment of the exemplary dynamic binding protocol, which has three tasks that run in parallel: discovery, association, and operation.

FIG. 7 shows an embodiment of the exemplary dynamic binding protocol 700, which has three tasks that run in parallel: discovery 702, association 704, and operation 706. During discovery 702, CEs or FEs learn about immediate neighbors and CEs in the network. During association 704, FEs associate CEs and are configured with basic parameters, such as IP interface addresses, hostnames, and the like. During operation 706, failover and packet tunneling between CEs and FEs is handled.

Figure 8:
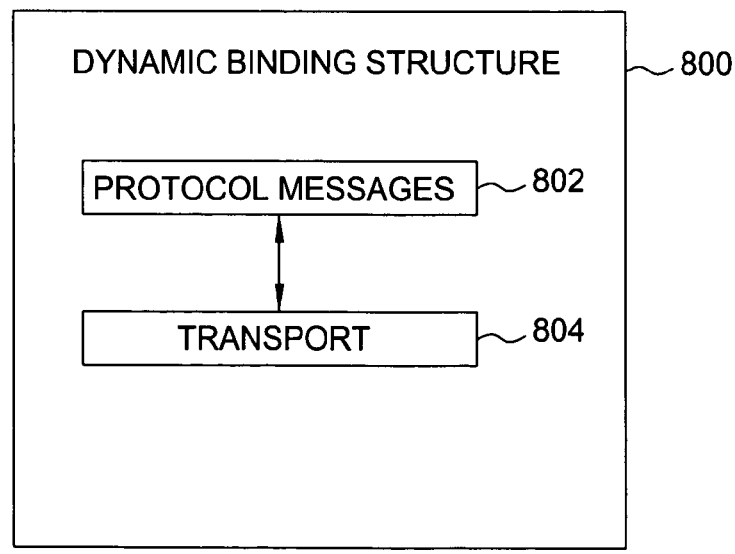
FIG. 8 is a diagram showing an embodiment of the exemplary dynamic binding structure.

FIG. 8 shows an embodiment of the exemplary dynamic binding structure 800. The dynamic binding structure 800 includes protocol messages 802 that are independent from transport 804. Possible transports include but are not limited to source routing, vector distance routing, simple link state routing, and bridging with spanning-tree.

Figure 9:
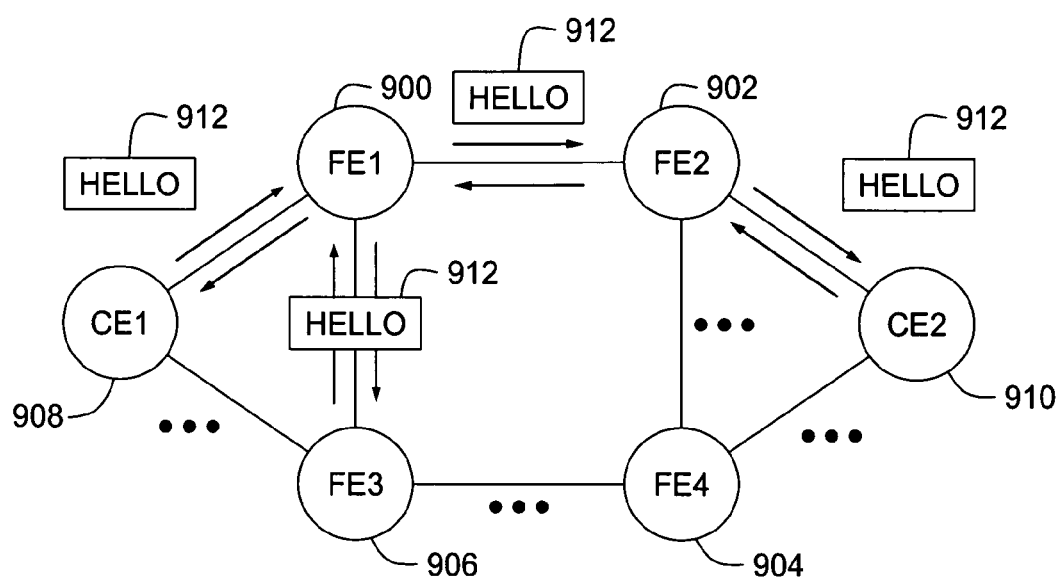
FIG. 9 is a diagram showing a discovery task of neighbor discovery, according to an embodiment of the exemplary dynamic binding protocol.

FIG. 9 shows a discovery task of neighbor discovery, according to an embodiment of the exemplary dynamic binding protocol. During neighbor discovery, CEs and FEs send periodic hello messages and monitor link states. In the example shown in FIG. 9, there are four FEs, FE1 900, FE2 902, FE3 904, and FE4 906 and two CEs, CE1 908 and CE2 910. For example, FE1 900 sends a hello message 912 to its neighbors, CE1 908, FE3 906, and FE2 902.

Figure 10:
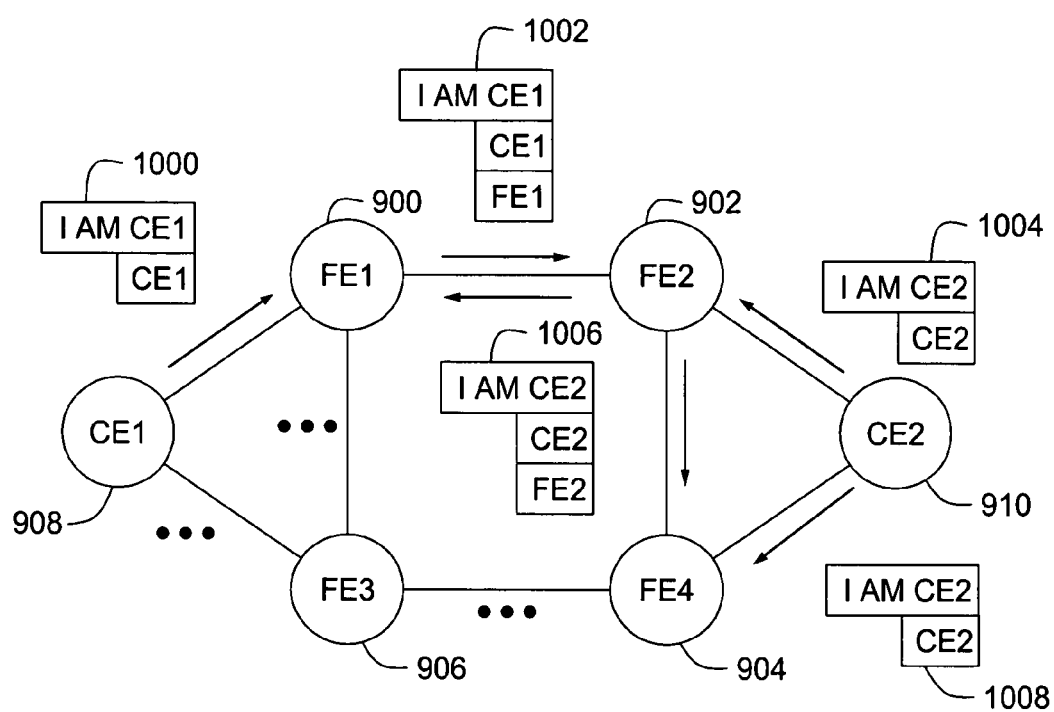
FIG. 10 shows a discovery task of CE advertisement, according to an embodiment of the exemplary dynamic binding protocol.

FIG. 10 shows a discovery task of CE advertisement, according to an embodiment of the exemplary dynamic binding protocol. During discovery, the CEs propagate themselves and the FEs aggregate and forward CE propagation. If source routing is used as transport, then the source routes are recorded. In the example shown in FIG. 10, after FE1 900 sent a solicitation message on all its interfaces, CE1 908 advertises itself by sending an advertisement message 1000 to FE1 900. The advertisement message 1000 includes the CEID identifying CE1 908 and the path from FE1 900 to CE1 908. Here, the path is one hop, from FE1 900 to CE1 908. When FE2 902 sent a solicitation, FE1 900 forwards the contents of the advertisement message 1000 it received from CE1 908 to its neighbor, FE2 902, by sending another message 1002 to FE2 902 that includes the CEID identifying CE1 908 and the path from FE2 902 to CE1 908, which FE1 900 knows by appending the path from FE1 900 to FE2 902 onto the path from CE1 908 to FE1 900. FE2 902 also received an advertisement message 1004 from CE2 910, which FE2 902 forwarded to FE4 904 in another message 1006, but FE4 904 already received an advertisement message 1008 directly from CE2 910.

Figure 11:
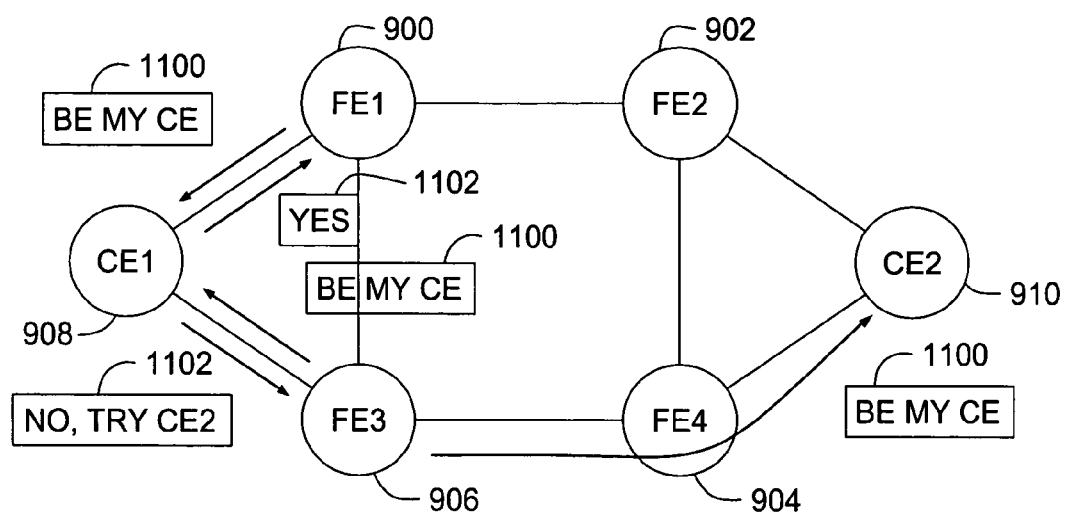
FIG. 11 shows an association task, according to an embodiment of the exemplary dynamic binding protocol.

FIG. 11 shows an association task, according to an embodiment of the exemplary dynamic binding protocol. During association, the FEs associate with the CEs to establish communication paths. A CE can reject any FE or reroute an FE to another CE. In the example shown in FIG. 11, FE1 900 sends an association request message 1100 to CE1 908. In response, CE1 908 sends an association acceptance message 1102. FE3 906 also sends an association request message 1100 to CE1 908, but CE1 908 sends back a negative response 1102 with a suggestion to try CE2 910. So, FE3 906 sends an association request message 1100 to CE2 910.

Figure 12:
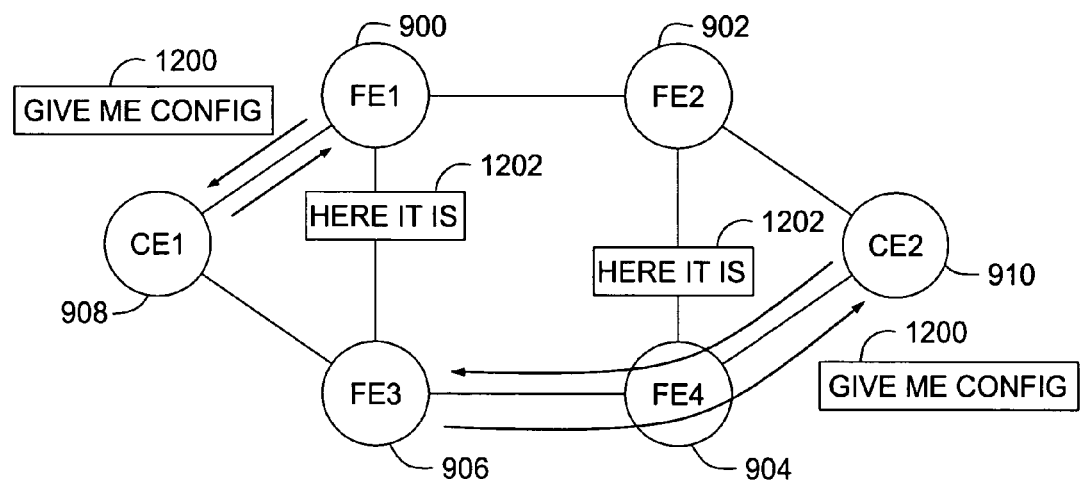
FIG. 12 shows a configuration task, according to an embodiment of the exemplary dynamic binding protocol.

FIG. 12 shows a configuration task, according to an embodiment of the exemplary dynamic binding protocol. During configuration, an associated CE provides basic FE configuration, such as IP addresses, host names, and the like. In the example shown in FIG. 12, FE1 900 sends a message 1200, requesting configuration from its associated CE, CE1 908. CE1 908 responds by sending configuration information 1202 to FE1 900. Similarly, FE3 906 sends a message 1200 requesting configuration from its associated CE, CE2 910. CE2 910 responds by sending configuration information 1202 to FE3 906.

Figure 13:
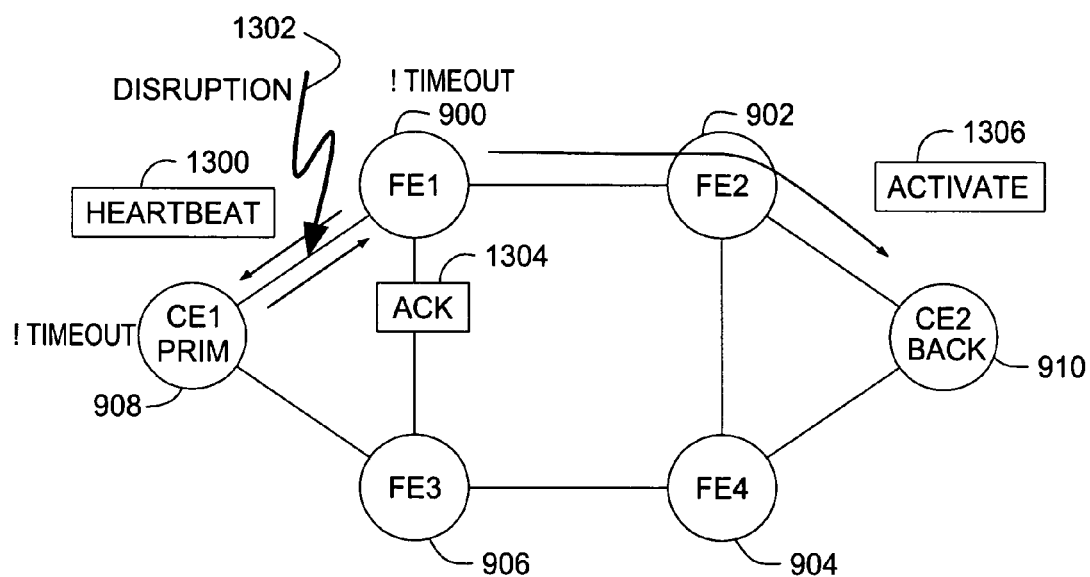
FIG. 13 shows an operation task of failover, according to an embodiment of the exemplary dynamic binding protocol.

FIG. 13 shows an operation task of failover, according to an embodiment of the exemplary dynamic binding protocol. During operation, an FE is associated with a primary and a set of backup CEs. An FE exchanges heartbeat messages with its primary and backup CEs for path monitoring. Upon path disruption, message timers expire and the FE activates one of its backup CEs, which in turn notifies higher layer protocols or applications, such as routing. In the example shown in FIG. 13, FE1 900 is associated with a primary CE, CE1 908, and a secondary or backup CE, CE2 910. FE1 900 sends a heartbeat message 1300, but there is a path disruption 1302 and a timer expires at FE1 900 before receiving any acknowledgement message 1304 from CE1 908. FE1 900 sends a message 1306 to CE2 910 to activate it as its managing CE.

Figure 14:
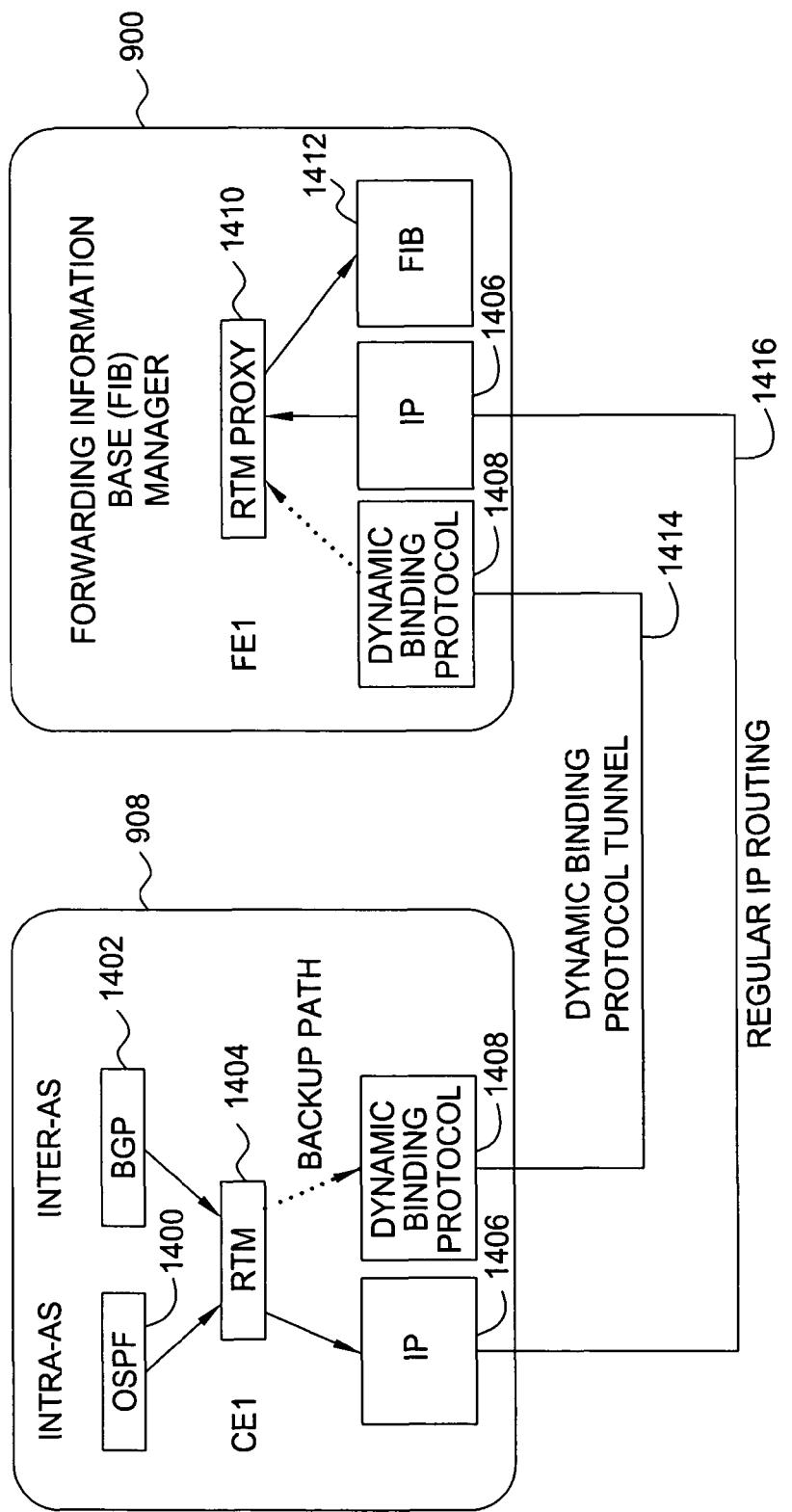
FIG. 14 shows an operation task of transport, according to an embodiment of the exemplary dynamic binding protocol.

FIG. 14 shows an operation task of transport, according to an embodiment of the exemplary dynamic binding protocol. A route table manager (RTM) collects route updates of various routing protocols and updates the forwarding information base (FIB) through regular IP. If the regular CE to FE communication path (e.g., IP routing) is unavailable, this exemplary dynamic binding protocol is used for FE FIB updates. In FIG. 14, CE1 908 includes OSPF 1400, BGP 1402, RTM 1404, IP 1406, and dynamic binding protocol 1408 processes. FE1 900 includes FIB management, an RTM proxy 1410, dynamic binding protocol 1408, IP 1406, and FIB 1412 processes. A tunnel 1414 connects the dynamic binding protocols 1408 in CE1 908 and FE1 900. Regular IP routing connects the IP 1406 in CE1 908 and FE1 900.

An exemplary embodiment of a dynamic binding protocol (a/k/a Dyna-BIND) includes various protocol specifications, message types, state machines, and message formats. The Dyna-BIND protocol is used to associate an FE with a CE in a NE. The Dyna-BIND protocol is used during the boot-up phase of an FE/CE and helps a FE discover a CE. The Dyna-BIND protocol runs all the time in the elements of the exemplary embodiment of the SoftRouter architecture, managing and maintaining associations between FEs and their corresponding CEs. The Dyna-BIND protocol does not support discovery or maintenance of inter-FE topology within a NE. Data path forwarding topology discovery and maintenance are handled by a different protocol within a NE.

Dyna-BIND Protocol Overview

This exemplary Dyna-BIND protocol is based on a pull model, where the FE takes the responsibility of discovering its local neighborhood, discovering and maintaining association with a CE and obtaining the basic configuration information from the CE. This is different from the push model for the operation of the FE in the later phases under a different protocol and NE routing protocols.

In this exemplary Dyna-BIND protocol, FEs and CEs continuously try to learn the path to all CEs in the network. They periodically ($t_{discover}$) broadcast hello messages on all their interfaces to allow neighbor discovery. Also they periodically ($t_{solicit}$) solicit CE information by broadcasting solicitation messages on all of their interfaces. On reception of a solicitation message, FEs respond with a reachability message and CEs respond with an advertisement message. On reception of a reachability or advertisement message, FE or CE create an adjacency entry in their neighbor table storing the neighbor CEID or FEID along with the interface and an aging parameter $w_{discover}*t_{solicit}$. If a reachability or advertisement message is not received in $w_{discover}$ periods, the adjacency is declared invalid. Advertisement messages propagate the CEID of the issuing CE along with a single hop source route to the CE. Reachability messages propagate to neighboring FEs aggregated CEIDs and their corresponding source routes. FEs derive source routes to CEs from advertisement or reachability messages whereas CEs derive source routes to a FE from the last received message.

A FE stores CEIDs and corresponding source route in its CE table. Each table entry is associated with an age parameter, which specifies the number of seconds remaining before the entry should be deleted from the table. If the CEID of a received reachability or advertisement message is unknown, a new entry is added and the initial age value is taken from the corresponding message entry. If a CEID already has a table entry, the age is updated. A CE stores FEIDs and corresponding source route in its FE table along with an age parameter ($w_{path}*t_{solicit}$), which specifies the number of seconds remaining before the source route to the FE should be declared invalid. The elements in the FE table are predefined through configuration and identify the FEs, which the CE is able to control as primary or backup.

In this exemplary Dyna-BIND protocol, a FE that is not associated with any CE waits for $t_{collect}$ time to populate its CE table, or the time it takes to find at least one CE, which ever is higher. Once this time passes, the FE picks one CE from the CE table, and contacts the CE with an associate request message using the source route in the CE table. If the CE is willing to accept this FE, then it responds to the FE with an associate accept message. The route from the CE to the FE is obtained by reversing the source route in the request message. When a CE is not willing/permitted to configure a FE that requests association, then it might know which CE is capable of managing that particular FE. If so, then this information is reported to the FE in an optional associate reject message. If the FE does not receive an associate accept or associate reject within $t_{associate}$, the associate request is retransmitted. After $r_{associate}$ retries the FE selects the next CE in its table. If all CEs have been tried the FE starts from the beginning. This loop runs indefinitely until an association is obtained.

After receiving an associate accept the FE responds with a configure request message to the CE, which allows the CE to configure the FE appropriately. The configuration is done by some method between the CE and the FE, and the CE conveys the configuration to the FE in a configure response message. If the FE does not receive a configure response within $t_{configure}$, the configure request is retransmitted. After $r_{configure}$ retries, the FE selects the next CE in its table. If all CEs have been tried, the FE starts from the table beginning.

After receiving a configure response message the FE responds with an activation request message to the CE, which indicates the CE that the FE is ready for operation. The CE acknowledges with an activation response. After $t_{activate}$ retries the FE selects the next CE in the table. If all CEs have been tried, the FE starts from the table beginning. The FE association of the previous CE will age out after $t_{expiry}$. Note that the CE table will continue to be populated during this time, based on the reachability messages described earlier. After activation the FE tries to associate a backup CE by cycling the CE table and sending associate request messages. The primary CE table entry will not be considered for backup. Since every FE is assumed to be connected to its corresponding CE either directly or indirectly, each FE will eventually come to know of the CE that is capable of managing it. This will ensure that each FE will eventually reach its managing primary CE, and hence will be configured. For each FE, there exists one primary CE, and at least one backup CE. The currently active CE is the managing CE, which can either be the primary CE or the backup CE.

Once a FE is associated with a CE, the FE periodically ($t_{heartbeat}$) exchanges a heartbeat message with the CE. The FE is responsible for maintaining the association with the CE. The CE acknowledges every heartbeat message sent by the FE. When the FE does not receive this acknowledgement message for more than $w_{path}$ periods, the association is declared invalid, and the FE tries to re-associate to a CE. If a CE does not receive heartbeat messages for $w_{path}$ periods of $t_{heartbeat}$, the association is declared invalid.

After FE-CE association payload messages provide higher layer protocols with a communication path. Higher layer protocols are encapsulated in payload messages and exchanged between associated FE and CE. No guarantees are given for reliable in sequence delivery. Higher layer packet exchange is only possible between associated CEs and FE.

Message Types and Formats

This exemplary Dyna-BIND protocol includes various messages, which are always broadcasted. If layer 3 interface addresses are used for transport, limited broadcasts or multicast addressing ensure message delivery, even if the remote peer chose an IP address belonging to a different subnet. The exemplary message formats include a message length in bytes that is less than a predetermined maximum message size, such as $2^{16}=65536$ bytes. The checksum is typically 2 bytes long and is either zero (no checksum) or 16-bit one's complement of the one's complement sum. The initial value for sequence numbers is chosen randomly and then incremented by one for every message sent and rolled over if the maximum value is reached, in this exemplary Dyna-BIND protocol. Exemplary message types and formats are provided, but other embodiments of the Dyna-BIND protocol are envisioned (e.g., usage of bridging with spanning tree instead of source routing).

FE-Originated Messages

FIG. 15 shows an exemplary layout for a neighbor hello message. The neighbor hello message is broadcasted by each FE and CE on all interfaces periodically, once every $t_{discover}$ seconds. Each message includes an FEID or CEID. This message is mandatory in this exemplary Dyna-BIND protocol and is used to check the link/interface status. It is recommended that $t_{discover}<t_{solicit}$ seconds. For this exemplary layout of the neighbor hello message, the version field 1500 holds 0x01, the type field 1502 holds 0x00, the length field 1504 holds the length in bytes of the whole message (16 bits), the checksum field 1506 holds zero if 16-bit one's complement of the one's complement sum (16 bits), the reserved field 1508 is for future use (16 bits), the source FEID or CEID field 1510 holds a unique string identifying the message originating FE or CE (128 bits).

FIG. 16 shows an exemplary layout for a solicitation message. The solicitation message is sent on all interfaces by each FE periodically, once every $t_{solicit}$ seconds. The aim of the solicitation is to find at least one route to a CE of choice. Each message includes the FEID along with an optional layer 2 or layer 3 identifier that helps to identify the FE. In addition, an FE can optionally specify a particular CE or a group of CEs to which it seeks to discover a route. For this exemplary layout of the solicitation message, the version field 1600 holds 0x01, the type field 1602 holds 0x01, the length field 1604 holds the length in bytes of the whole message (16 bits), the checksum field 1606 holds zero or a 16-bit one's complement of the one's complement sum (16 bits), the reserved field 1608 is for future use (16 bits), the soliciting FEID or CEID field 1610 holds a unique string identifying the message originating FE (128 bits), the option length field 1612 holds the length of the option including the length field (16 bits), the option type field 1614 is defined by FIG. 6 (8 bits), and the option reserved field is for future use (8 bits).

FIG. 17 shows type, length, value (TLV) definitions for the option type field 1614. There can be multiple TLV's of type 1, which implies that the FE is looking to associate with a set of CEs listed in the TLV option values.

The solicitation message is also used when the association is disrupted temporarily to discover a different CE or an alternate route to a desired CE. When this option is used, the message includes an identifier pertaining to the CE that was last associated with the FE and the source route used to contact the CE.

Figure 18:
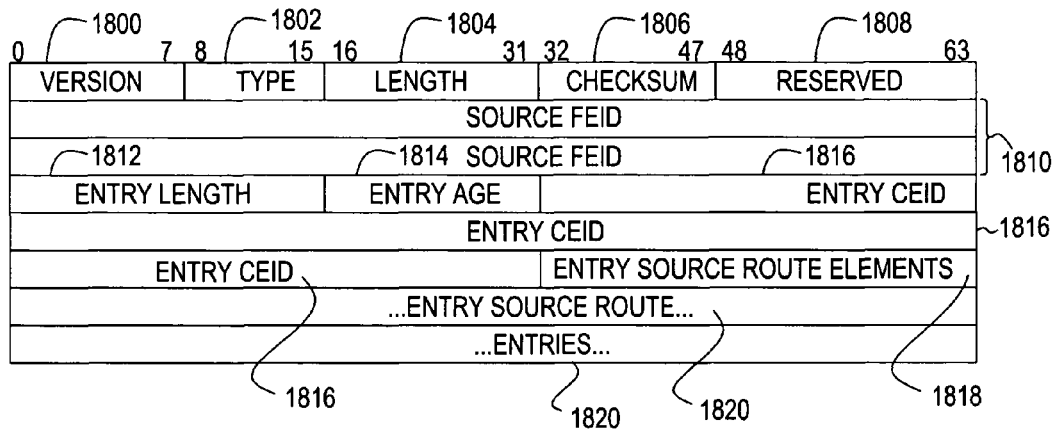
FIG. 18 is a diagram showing an exemplary layout for a reachability message.

FIG. 18 shows an exemplary layout for a reachability message. The reachability message is sent out by a FE in response to a solicitation message from a neighboring FE. The reachability message includes the CE table of the FE, by default. For this exemplary layout, the version field 1800 holds 0x01, the type field 1802 holds 0x02, the length field 1804 holds the length in bytes of the whole message (16 bits), the checksum field 1806 holds zero or a 16-bit one's complement of the one's complement sum (16 bits), the reserved field 1808 is 16 bits, the source FEID 1810 holds a unique string identifying the message originating FE (128 bits), the entry length field 1812 holds the length of entry including the length field in bytes (16 bits), the entry age field 1814 holds the time in seconds until the entry expires (16 bits), the entry CEID field 1816 holds the CEID for which this entry propagates a source route (128 bits), the entry source route elements field 1818 holds the number of elements in the source route list (32 bits), and the entry source route field 1820 holds a list of FEIDs that identifies the path from the entry CE to the neighbor FE (multiple of 128 bits), where the first FEID in the list is the next hop of CE.

Figure 19:
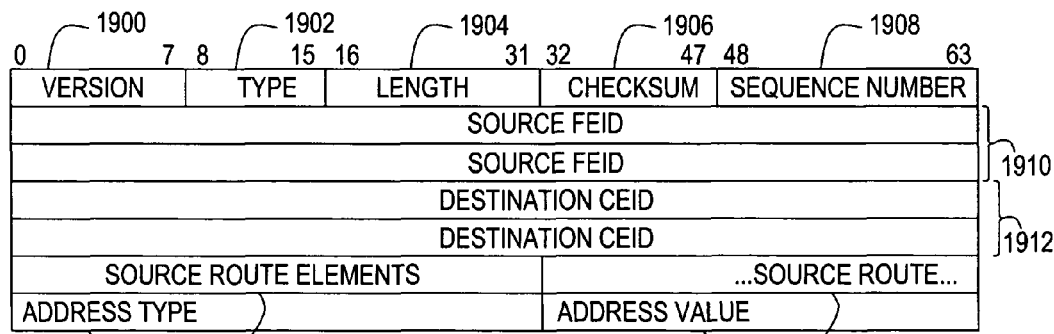
FIG. 19 is a diagram showing an exemplary layout of an associate request message.

FIG. 19 shows an exemplary layout of an associate request message. The associate request message is sent by a FE in order to request its association with a given CE. The message contains the target CEID, the FEID, and the source-route to route the message from the FE to the CE. The source-route is specified as a sequence of FEIDs, starting with the originating FEID. If a reply is not received within $t_{associate}$ seconds of sending a request, the FE retries $r_{associate}$ times and then purges the CE from the CE table and tries to contact the next CE in its CE table. If the table end is reached, the FE starts again from the CE table beginning. In this exemplary layout, the version field 1900 holds 0x01, the type field 1902 holds 0x04, the length field 1904 holds the message length in bytes of the whole message (16 bits), the checksum field 1906 holds zero or 16-bit one's complement of the one's complement sum (16 bits), the sequence number field 1908 holds a sequence number (16 bits), the source FEID field 1910 holds a unique string identifying the message originating FE (128 bits), the destination CEID field 1912 holds the CEID that the FE wishes to associate with (128 bits), the source route elements field 1914 holds the number of elements in the source route list (32 bits), the source route field 1916 holds a list of FEIDs that identifies the path from the FE to the CE (multiple of 128 bits), where the first FEID in the list is the next hop of the sending FE, the address type field 1918 holds the layer 3 protocol type, such as IP, and the address value field 1920 holds an FE layer 3 address, which higher layer protocols of the CE may use to exchange messages with the FE over the discovery protocol.

Figure 20:
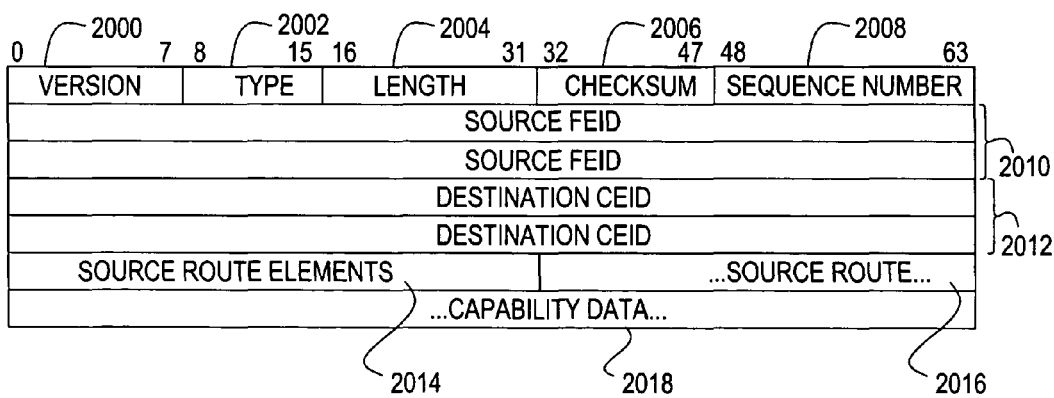
FIG. 20 is a diagram showing an exemplary layout of a configure request message.

FIG. 20 shows an exemplary layout of a configure request message. The configure request message is sent by the FE in response to a successful associate accept message from a CE. The configure request describes the local configuration and the capabilities of the FE to the CE. If a reply is not received within $t_{associate}$ seconds of sending a request, the FE times out, retries $r_{configure}$ times and then sends an associate request message to the next CE. If the end of the CE table is reached, the FE starts again from the beginning of the CE table. In this exemplary layout, the version field 2000 holds 0x01, the type field 2002 holds 0x07, the length field 2004 holds the message length in bytes of the whole message (16 bits), the checksum filed 2006 holds zero or the 16-bit one's complement of the one's complement sum (16 bits), the sequence number field 2008 holds the sequence number (16 bits), the source FEID field 2010 holds a unique string identifying the message originating FE (128 bits), the destination CEID field 2012 holds the CEID that the FE wishes to associate with (128 bits), the source route elements field 2014 hold the number of elements in the source route list (32 bits), and the source route field 2016 holds a list of FEIDs that identifies the path from the FE to the CE (multiple of 128), where the first FEID in the list is the next hop of the sending FE. The capability data field 2018 is for future use.

Figure 21:
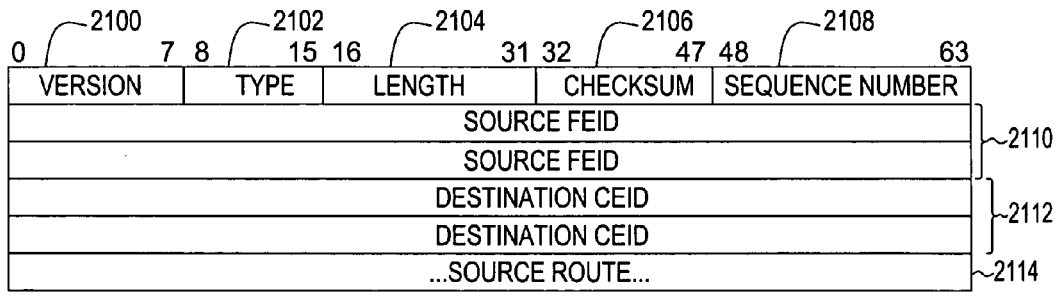
FIG. 21 is a diagram showing an exemplary layout for a heartbeat message.

FIG. 21 shows an exemplary layout for a heartbeat message. The heartbeat message is a periodic message sent by the FE and acknowledged by the managing CE. The message is sent out once every $t_{heartbeat}$ seconds. The heartbeat messages from the FE have increasing sequence numbers. In this exemplary layout, the version field 2100 holds 0x01, the type field 2102 holds 0x0A, the length field 2104 holds the message length in bytes of the whole message (16 bits), the checksum field 2106 holds zero or the 16-bit one's complement of the one's complement sum (16 bits), the sequence number field 2108 holds the sequence number (16 bits), the source CEID field 2110 holds a unique string identifying the message originating CE (128 bits), the destination FEID field 2112 holds the FEID that the CE wishes to acknowledge (128 bits), and the source router field 2114 holds a list of FEIDs that identifies the path from the CE to the FE (multiple of 128 bits), where the first FEID in the list is the next hop of the sending CE.

CE-Originated Messages

There are five CE-originated messages: CE advertisement, associate accept, CE-associate-reroute, configure response, and heartbeatack.

Figure 22:
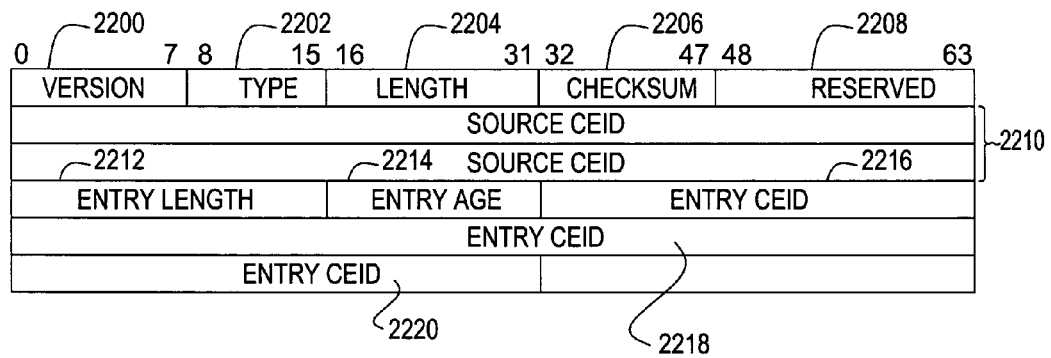
FIG. 22 is a diagram showing an exemplary layout for an advertisement message.

FIG. 22 shows an exemplary layout for an advertisement message. The advertisement message is sent by a CE in response to a solicitation message from a neighbor. The advertisement message includes the CEID of the CE. In this exemplary layout, the version field 2200 holds 0x01, the type field 2202 holds 0x03, the length field 2204 holds the message length in bytes of the whole message (16 bits), the checksum field 2206 holds zero or the 16-bit complement of the one's complement sum (16 bits), the reserved field 2208 is for future use (16 bits), the source CEID field 2210 holds a unique string identifying the CE (128 bits), the entry length field 2212 holds the length of entry including the length field (16 bits), the entry age field 2214 holds the time in seconds until the entry expires (16 bits), the entry CEID field 2216 holds the CEID of the advertised CE (128 bits). The advertisement message is similar to the reachability message, except that the CE table entry has only one entry, and no source route is present (i.e., source route of zero length).

Figure 23:
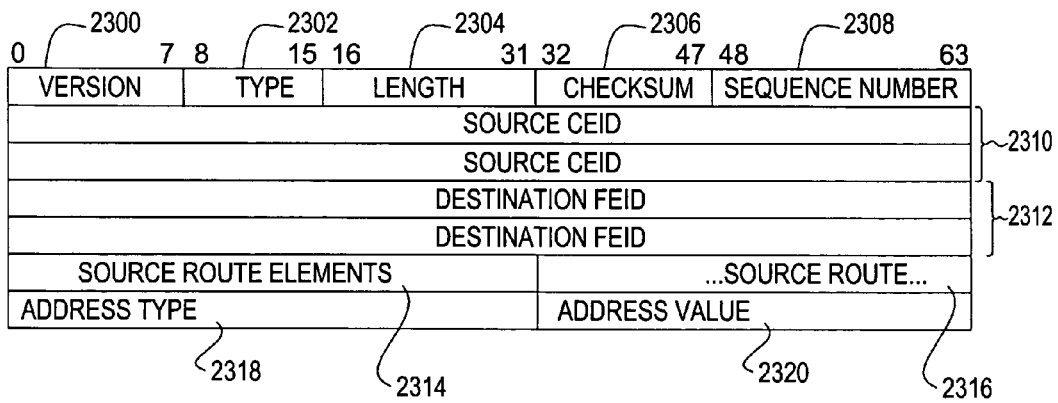
FIG. 23 is a diagram showing an exemplary layout for an associate accept message.

FIG. 23 shows an exemplary layout for an associate accept message. The associate accept message is sometimes sent by a CE in response to an associate request message from a FE. If the CE is authorized or able to configure the requesting FE, then the CE accepts the request by sending this message using a source-route determined by reversing the source-route in the associate request message from the FE. In this exemplary layout, the version field 2300 holds 0x01, the type field 2302 holds 0x05, the length field 2304 holds the message length in bytes of the whole message (16 bits), the checksum field 2306 holds zero or the one's complement of the one's complement sum (16 bits), the sequence number field 2308 holds the sequence number (16 bits), the source CEID field 2310 holds a unique string identifying the message originating CE (128 bits), the destination FEID field 2312 holds the FEID of the FE to which this message is addressed (128 bits), the source route elements field 2314 holds the number of elements in the source route list (32 bits), the source route field 2316 holds a list of FEIDs that identifies the path from the CE to the FE (a multiple of 128 bits), where the first FEID in the list is the next hop of the sending CE, the address type field 2318 holds the layer 3 protocol type, such as IP and the address value field 2320 holds a CE layer 3 address, which higher layer protocols of the CE may use to exchange messages with the FE over the discovery protocol.

Figure 24:
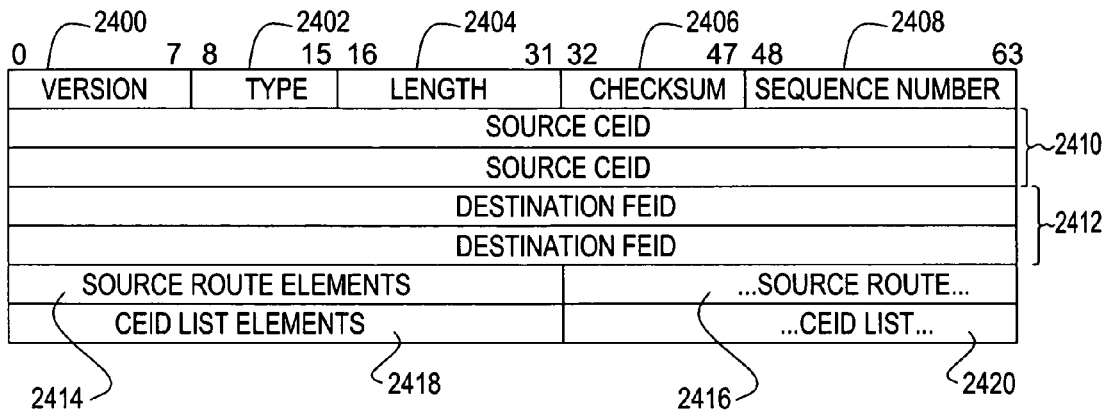
FIG. 24 is a diagram showing an exemplary layout for an associate reject message.

FIG. 24 shows an exemplary layout for an associate reject message. The associate reject message is sent by a CE in response to an associate request message from a FE. If the CE is not capable or unwilling to configure the FE, then this message may be sent. This message optionally specifies the CEID of an alternative CE that is capable of configuring the FE. In this exemplary layout, the version field 2400 holds 0x01, the type field 2402 holds 0x06, the length field 2404 holds the message length in bytes of the whole message (16 bits), the checksum field 2406 holds zero or the 16-bit one's complement of the one's complement sum (16 bits), the sequence number field 2408 holds the sequence number (16 bits), the source FEID field 2410 holds a unique string identifying the message originating CE (128 bits), the destination CEID field 2412 holds the CEID of the FE to which this message is addressed (128 bits), the CEID list elements field 2418 holds the number of elements in the CEID list (32 bits), the CEID list field 2420 holds the list of CEIDs defining alternate CEs to manage the requesting FE (multiple of 128 bits), the source route elements field 2414 holds the number of elements in the source route list (32 bits), and the source route field 2416 holds the list of FEIDs that identifies the path from the CE to the FE (multiple of 128 bits), where the first FEID in the list is the next hop of the sending CE.

Figure 25:
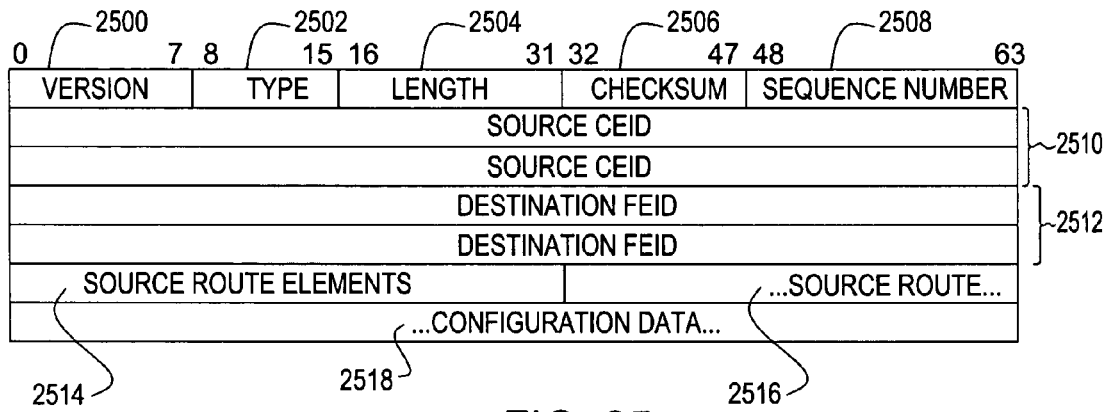
FIG. 25 is a diagram showing an exemplary layout for a configure response message.

FIG. 25 shows an exemplary layout for a configure response message. The configure response message is sent in response to a valid configure request message from a FE. This message provides information for configuring the FE. In this exemplary layout, the version field 2500 holds 0x01, the type field 2502 holds 0x08, the length field 2504 holds the message length in bytes of the whole message (16 bits), the checksum field 2506 holds zero or the 16-bit one's complement of the one's complement sum (16 bits), the sequence number field 2508 holds the sequence number (16 bits), the source CEID field 2510 holds a unique string identifying the message originating CE (128 bits), the destination FEID field 2512 holds the FEID of the FE to which this message is addressed (128 bits), the source route elements field 2514 holds the number of elements in the source route list (32 bits), the source route field 2516 holds the list of FEIDs that identifies the path from the CE to the FE (multiple of 128 bits), where the first FEID in the list is the next hop of the sending CE.

Figure 26:
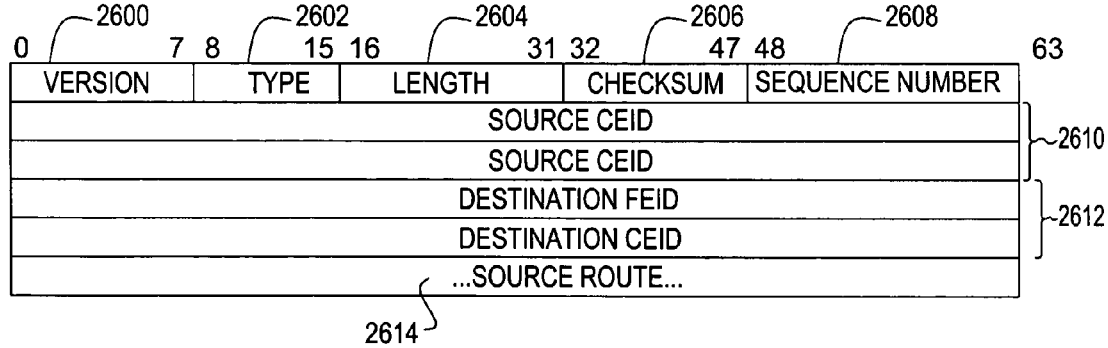
FIG. 26 is a diagram showing an exemplary layout of a heartbeatack message.

FIG. 26 shows an exemplary layout of a heartbeatack message. The heartbeatack message acknowledges the heartbeat message and is sent by the managing CE. The message includes the sequence number of the heartbeat message that is being acknowledged. In this exemplary layout, the version field 2600 holds 0x01, the type field 2602 holds 0x0A, the length field 2604 holds the message length in bytes of the whole message (16 bits), the checksum field 2606 holds zero or the 16-bit one's complement of the one's complement sum (16 bits), the sequence number field 2608 holds the sequence number (16 bits), the source CEID field 2610 holds a unique string identifying the message originating CE (128 bits), the destination FEID field 2612 holds the FEID that the CE wishes to acknowledge (128 bits), and the source route field 2614 holds a list of FEIDs that identifies the path from the FE to the CE (multiple of 128 bits), where the first FEID in the list is the next hop of the sending FE.

Dyna-BIND Protocol State Machine

There is an embodiment of an exemplary state machine for the Dyna-BIND protocol. The state machine includes various states, the variables and the tables maintained, and the state transitions associated with elements of the network running an embodiment of the Dyna-BIND protocol.

Figure 27:
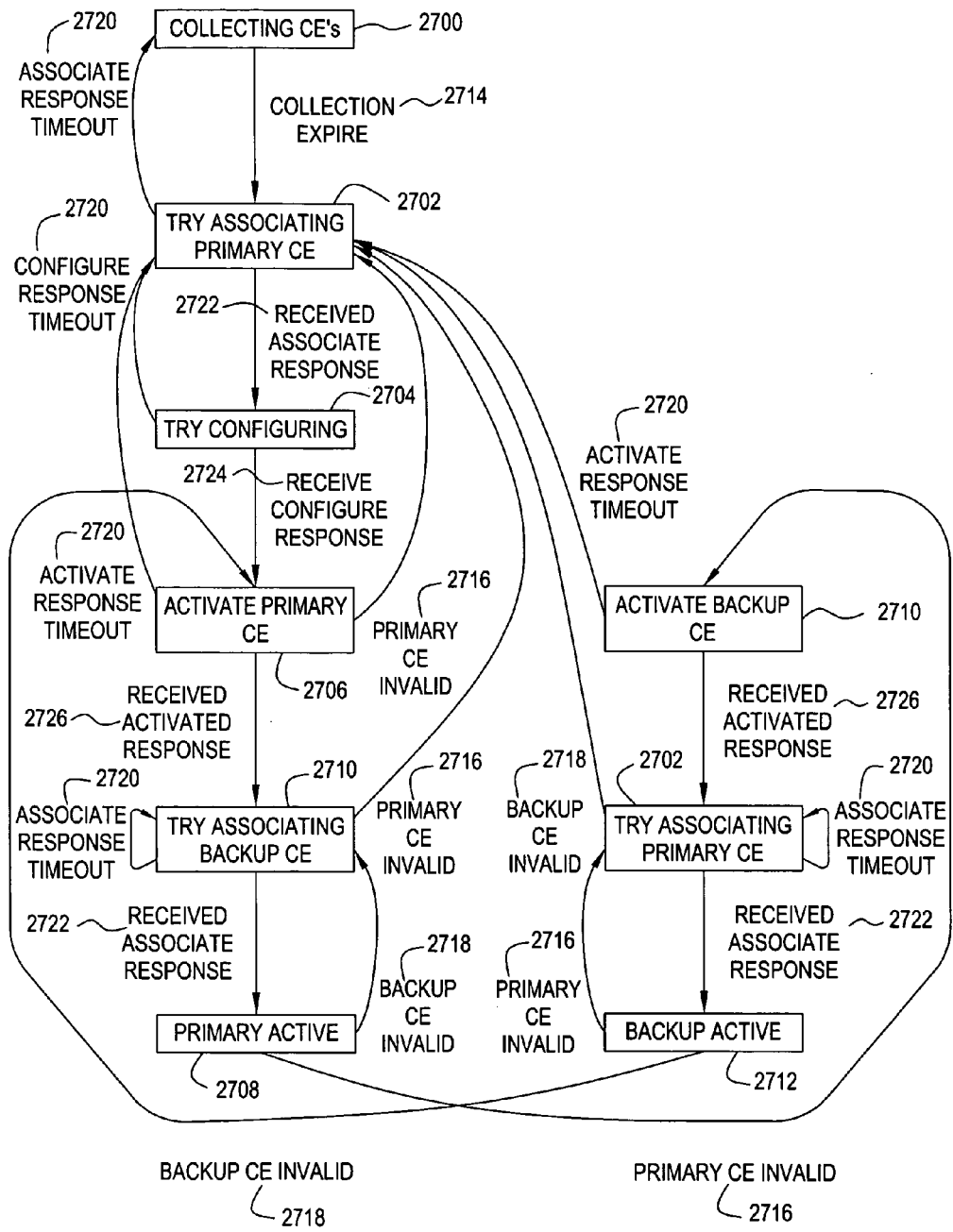
FIG. 27 is an exemplary FE state transition diagram.

FIG. 27 is an exemplary FE state transition diagram. There are nine states associated with FEs in this embodiment of the exemplary state machine: 1) collecting 2700, 2) try associating primary 2702, 3) try configuring primary 2704, 4) try activating primary 2706, 5) primary up (not shown), 6) primary active 2708, 7) try activating backup 2710, 8) backup up (not shown), and 9) backup active 2712.

After booting, the FE remains in the collecting state 2700 for $t_{collect}$ seconds, while establishing neighbor adjacencies and soliciting neighbors for CEs and their source routes.

In the try associating primary state 2702, the FE iterates the CE table, tries to associate a primary CE, and waits for a response. If the timeout event (i.e., no response in time period $t_{associate}$ and after $r_{associate}$ retries) is generated, the FE tries to associate with the next CE in the CE table.

In the try configuring primary state 2704, the FE sends a configure request message and waits for a response. If the events timeout (i.e., no response in time period $t_{configure}$) or primary invalid (i.e., heartbeat fails) are generated, the FE tries to associate with the next CE in the CE table.

In the try activating primary state 2706, the FE sends an activate request message and waits for a response. If the events timeout (i.e., no response in time period $t_{activate}$ and after $r_{associate}$ retries) or primary invalid (heartbeat failed) are generated, the FE tries to associate with the next CE in the CE table.

In the primary up state, the FE sends an association request message to associate a backup CE and waits for a response. If the event timeout (i.e., no response in time period $t_{associate}$ and after $r_{associate}$ retries) is generated, the FE remains in the primary up state. If the event CE learned is generated, a new association request message is sent. If the primary invalid event is generated, the FE tries to associate with the next CE in the CE table.

In the primary active state 2708, the primary and backup CE are associated and the primary CE is the managing CE (activated). If the event backup invalid (i.e., heartbeat timeout to backup CE) is received, the FE tries to associate with a new backup CE. If the event primary invalid (i.e., heartbeat timeout to primary CE) is generated, the FE activates the backup CE and tries to associate a new primary CE.

In the try activating backup state 2710, the FE sends an activate request message and waits for a response. If the vents timeout (i.e., no response in time period $t_{activate}$ and after $r_{activate}$ retries) or backup invalid (i.e., heartbeat fails) are generated, the FE tries to associate with the next CE in the CE table.

In the backup up state, the FE sends an association request message to associate a primary CE and waits for a response.

If the event timeout (i.e., no response in time period $t_{associate}$ and after $r_{associate}$ retries) is generated, the FE remains in this state. If the event CE learned is generated, a new association request message is sent. If the backup invalid event is generated, the FE tries to associate with the next CE in the CE table.

In the backup active state 2712, the primary and backup CEs are associated and the backup CE is the managing CE (activated). If the event primary invalid (i.e., heartbeat timeout to primary CE) is received, the FE tries to associate a new primary CE. If the event backup invalid (i.e., heartbeat timeout to backup CE) is generated, the FE activates the primary CE and tries to associate a new backup CE.

There are eight events associated with FEs in this embodiment of the exemplary state machine: 1) collection expire 2714, 2) primary invalid 2716, 3) backup invalid 2718, 4) timeout 2720, 5) CE learned (not shown), 6) associate response received 2722, 7) configure response received 2724, and 8) activate response received 2726. Collection expire 2714 indicates the end of the CE collection period $w_{collect}$ in the collecting state. Primary invalid 2716 indicates that the heartbeat to the primary CE timed out. Backup invalid 2718 indicates that the heartbeat to the backup CE timed out. Timeout 2720 indicates that no response was received to a sent request. CE learned indicates that a new CE was added to the CE table. Associate response received 2722 indicates that an associate response message was received. Configure response received 2724 indicates that a configure response message was received. Activate response received 2726 indicates that an activate response message was received.

There are two variables associated with FEs in this embodiment of the exemplary state machine, neighbor table and CE table. The neighbor table is a local neighborhood database maintained at FE and CE. The neighbor table stores information regarding adjacent FEs and CEs and through which local interfaces to reach them. Neighbors are discovered through the reception of hello messages, which provide CEID or FEID of the sender. Hello messages are broadcasted by CEs and FEs periodically every $t_{discover}$ seconds on all DynaBIND enabled interfaces. Each neighbor table entry has an age value that is reset whenever a solicitation message is received. An adjacency is removed when no hello message is received within $w_{discover}*t_{discover}$ seconds. The CE table is maintained at the FE and contains the set of CEs and the routes to them from the FE. The CE table is populated whenever the FE receives either an advertisement or reachability message. Each entry in the CE table is of the form (<CEID>, <age>, <source-route>). An entry from an advertisement message is entered as (<CEID>, $t_{expiry}$, FEID→CEID).

Figure 28:
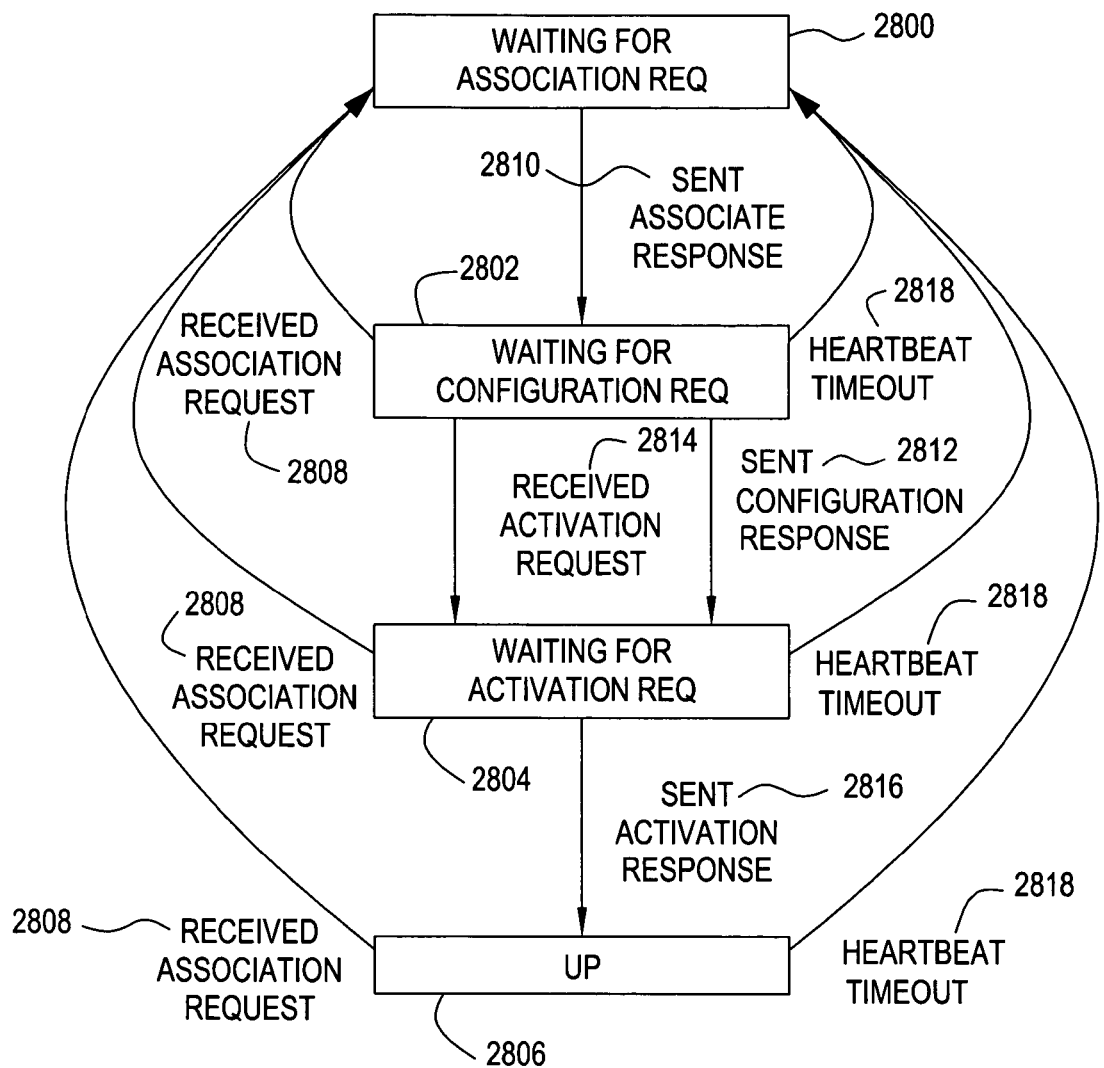
FIG. 28 is an exemplary CE state transition diagram per FE.

FIG. 28 is an exemplary CE state transition diagram, which is traversed for each FE that tries to associate. There are four states associated with CEs in this embodiment of the exemplary state machine: 1) waiting for association 2800, 2) waiting for configuration 2802, 3) waiting for activation 2804, and 4) up 2806.

In the waiting for association state 2800, the CE is idle. The FE configuration data is known but no contact is established. If an association request message is received, a response is sent and the state transitions to waiting for configuration.

In the waiting for configuration state 2802, the FE is associated. If a configuration request message is received, a response is sent and the state is advanced to the waiting for activation state. The waiting for configuration state may be skipped. If an activation request event is received, the state transitions to waiting for activation along with a received activation event. If an association request event is received, the FE rebooted unnoticed by the CE (heartbeat timeout) and the state transitions back to the waiting for association state along with an association request event. If the event heartbeat timeout arises, the path to the FE or the FE itself failed and the state transitions back to the waiting for association state.

In the waiting for activation state 2804, if an activation request event is received, a response is sent and the state advances to the up state. If an association request event is received, the FE rebooted unnoticed by the CE (heartbeat timeout) and the state transitions back to the waiting for association state along with an association request event. If the event heartbeat timeout arises, the path to the FE or the FE itself failed and the state transitions back to the waiting for association state.

In the up state 2806, the FE is up, operational, and managed by the CE. If an association request event is received, the FE rebooted unnoticed by the CE (heartbeat timeout) and the state transitions back to the waiting for association state along with an association request event. If the event heartbeat timeout arises, the path to the FE or the FE itself failed and the state transitions back to the waiting for association state.

There are seven events associated with CEs in this embodiment of the exemplary state machine: 1) association request received 2808, 2) association response sent 2810, 3) configuration request received (not shown), 4) configuration response sent 2812, 5) activation request received 2814, 6) activation response sent 2816, and 7) heartbeat timeout 2818. Association request received 2808 indicates that an association request message was received. Association response sent 2810 indicates that an association response message was sent. Configuration request received indicates that a configuration request message was received. Configuration response sent 2812 indicates that a configuration response message was sent. Activation request received 2814 indicates that an activation request message was received. Activation response sent 2816 indicates that an activation response message was sent. Heartbeat timeout 2818 indicates that a heartbeat timeout occurred, because no heartbeat request message was received in time.

There are two variables associated with CEs in this embodiment of the exemplary state machine: neighbor table and FE table. The neighbor table is described above. The FE table is maintained at the CE and lists the FEs that the CE is able to control. The FE table is populated through configuration data. A table entry reaches the associated state if the corresponding FE associated with the CE. A table entry reaches the activated state if the corresponding FE activated the CE. A table entry has a valid source route in the associated and activated state, which is refreshed with every heartbeat message received every $t_{heartbeat}$ seconds. If a heartbeat message was not received for $w_{path}*t_{heartbeat}$ seconds, the table entry is moved to the unassociated state with an invalid source route indication.

Figure 29:
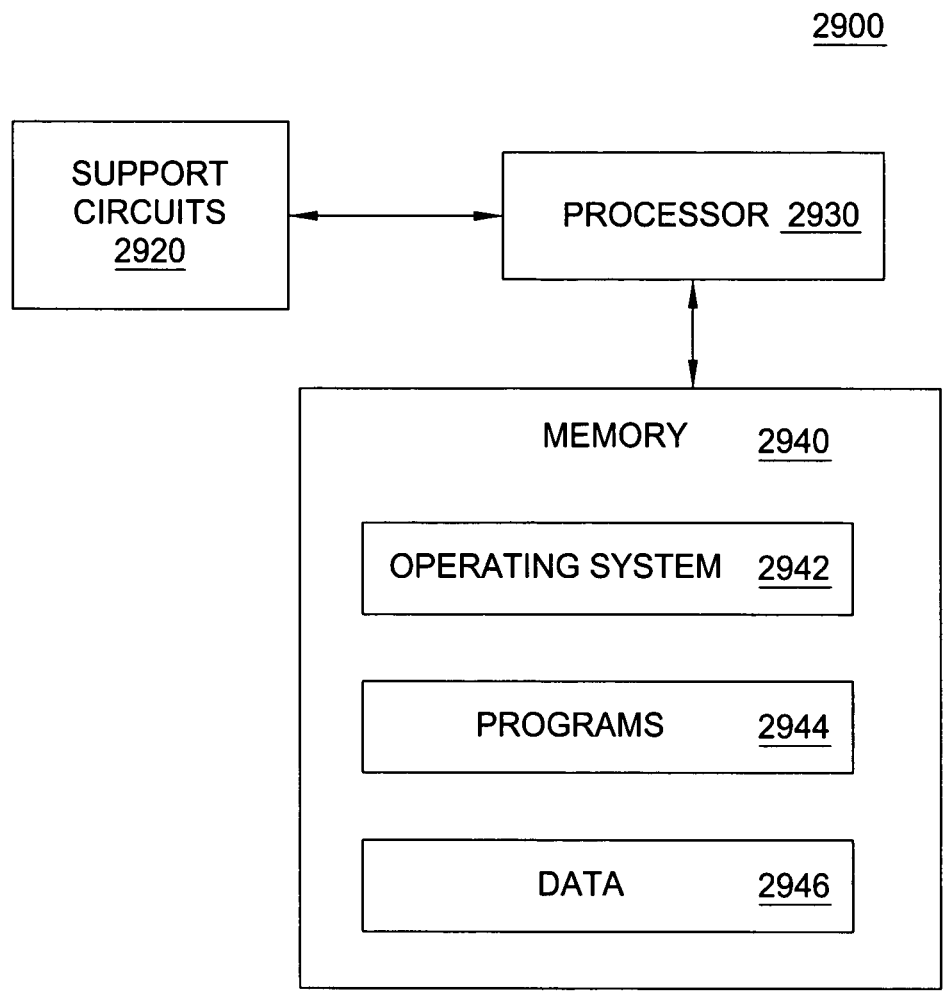
FIG. 29 is a high level block diagram showing a computer. To facilitate understanding, identical reference numerals have been used, where possible, to designate identical elements that are common to the figures.

FIG. 29 is a high level block diagram showing a computer. The computer 2900 may be employed to implement embodiments of the present invention. The computer 2900 comprises a processor 2930 as well as memory 2940 for storing various programs 2944 and data 2946. The memory 2940 may also store an operating system 2942 supporting the programs 2944.

The processor 2930 cooperates with conventional support circuitry such as power supplies, clock circuits, cache memory and the like as well as circuits that assist in executing the software routines stored in the memory 2940. As such, it is contemplated that some of the steps discussed herein as software methods may be implemented within hardware, for example, as circuitry that cooperates with the processor 2930 to perform various method steps. The computer 2900 also contains input/output (I/O) circuitry that forms an interface between the various functional elements communicating with the computer 2900.

Although the computer 2900 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A dynamic binding protocol process, comprising:
   establishing a discovery-protocol based communication tunnels between forwarding elements (FEs) and respective control elements (CEs) in a network including a data plane and a control plane that are physically and logically separate, the data plane including a plurality of FEs for packet forwarding wherein each FE comprises a logical entity representing a collection of router ports of a plurality of routing devices, the control plane including a plurality of CEs for configuring, controlling, and providing routing information to one or more FEs wherein each CE comprising a logical entity instantiated at a computing device;
   configuring each FE of the plurality of FEs to derive source routes to the plurality of CEs using advertisement or reachability messages, where the each FE and at least one of the plurality of CE are remotely located being separated by multiple hops;
   configuring each CE of the plurality of CEs to derive source routes to the plurality of FEs using received advertisement or reachability messages, where the each CE and at least one of the plurality of FE are remotely located being separated by multiple hops;
   associating each FE with an active CE and at least one backup CE, each FE configured to route traffic in accordance with routing updates received from said active CE via either of an IP routing protocol and a communication tunnel there between; and
   in response to an inability of an FE to communicate with a respective active CE, selecting a respective backup CE as an active CE for said FE, said FE and said active CE communicating via a tunnel there between.

2. The dynamic binding protocol process of claim 1, wherein establishing said discovery-protocol based communication tunnels includes:
   discovering at each FE a respective collection of advertising CEs;
   monitoring at each FE a primary CE communication path; and
   switching control of a FE from a respective primary CE to a respective backup CE in response to a failure of the primary CE communication path.

3. The dynamic binding protocol process of claim 1, wherein a controlling traffic transport includes allowing FE to CE control communication when a routing protocol failure leaves and a FE being unreachable.

4. The dynamic binding protocol process of claim 1, further comprising:
   performing a discovery task for identifying neighboring CEs and FEs for each CE and FE, an association task for associating each FE with primary and backup CEs, and an operation task for controlling packet tunneling and CE failover.

5. The dynamic binding protocol process of claim 4, wherein the discovery task, the association task, and the operation task run in parallel.

6. The dynamic binding protocol process of claim 4, wherein the operation task is configured to update a forwarding information base (FIB) associated with a FE in response to unavailability of a routing path between the FE and a respective active CE.

7. A dynamic binding protocol process, comprising:
   establishing discovery-protocol based communication tunnels between forwarding elements (FEs) and respective control elements (CEs) in a network including a data plane and a control plane that are physically and logically separate, the data plane including a plurality of FEs for packet forwarding wherein each FE comprises a logical entity representing a collection of router ports of a plurality of routing devices, the control plane including a plurality of CEs for configuring, controlling, and providing routing information to one or more FEs wherein each CE comprising a logical entity instantiated at a computing device;
   associating each FE with an active CE and at least one backup CE, each FE configured to route traffic in accordance with routing updates received from said active CE via either of an IP routing protocol and a communication tunnel there between; and
   in response to an inability of an FE to communicate with a respective active CE, selecting a respective backup CE as an active CE for said FE, said FE and said active CE communicating via a tunnel there between,
   wherein establishing the discovery-protocol based communication tunnels between the FEs and the respective CEs comprises:
   configuring said FEs and CEs to periodically transmit hello messages toward neighboring nodes;
   configuring said FEs and CEs to periodically transmit solicitation messages;
   configuring said CEs to transmit an advertisement message in response to receiving a solicitation message;
   configuring said FEs to transmit a reachability message in response to receiving a solicitation message; and
   configuring said FEs to aggregate received advertisement and corresponding reachability messages to define thereby a respective collection of CEs, wherein each FE is associated with an active CE and at least one backup CE from within the respective collection of CEs.

8. The dynamic binding protocol process of claim 7, wherein associating a FE and a CE comprises said CE transmitting and associate accept message to said FE in response to receiving an associate request message from said FE.

9. The dynamic binding protocol process of claim 7, further comprising:

performing a protocol failover from one CE to a back up CE for a respective FE in response to a path disruption associated with said respective FE.

10. The dynamic binding protocol process of claim 9, wherein performing the protocol failover comprises:
sending an activation request to the backup CE in response to said path disruption associated with said FE; and
receiving an activation acknowledgement from the backup CE, said FE being responsive to control information received from the backup CE.

11. The dynamic binding protocol process of claim 7, further comprising:
configuring each FE to periodically transmitting a heartbeat message to each associated CE, and to determine a path disruption in response to a failure to receive a corresponding heartbeat acknowledgement messages from the associated CE.

12. The dynamic binding protocol process of claim 7, wherein dynamically establishing a discovery-protocol based communication tunnel comprises:
configuring each FE to derive source routes to corresponding CEs using at least the advertisement or reachability message; and
configuring each CE to derive source routes to corresponding FEs using at least the advertisement or reachability message.

13. A non-tangible and non-transitory computer-readable storage medium having instructions stored thereon which, when executed by a processor at a network element, perform a dynamic binding protocol process, the process comprising:
establishing discovery-protocol based communication tunnels between forwarding elements (FEs) and respective control elements (CEs) in a network including a data plane and a control plane that are physically and logically separate, the data plane including a plurality of FEs for packet forwarding wherein each FE comprises a logical entity representing a collection of router ports of a plurality of routing devices, the control plane including a plurality of CEs for configuring, controlling, and providing routing information to one or more FEs wherein each CE comprising a logical entity instantiated at a computing device;
configuring each FE of the plurality of FEs to derive source routes to the plurality of CEs using advertisement or reachability messages, where the each FE and at least one of the plurality of CE are remotely located being separated by multiple hops;
configuring each CE of the plurality of CEs to derive source routes to the plurality of FEs using received advertisement or reachability messages, where the each CE and at least one of the plurality of FE are remotely located being separated by multiple hops;
associating each FE with an active CE and at least one backup CE, each FE configured to route traffic in accordance with routing updates received from said active CE via either of an IP routing protocol and a communication tunnel there between; and
in response to an inability of an FE to communicate with a respective active CE, selecting a respective backup CE as an active CE for said FE, said FE and said active CE communicating via a tunnel there between.

14. A forwarding element (FE) configured to communicate with control elements (CEs) using a dynamic binding protocol in a network including a data plane and a control plane that are physically and logically separate, said CEs comprising logical entities instantiated at computing devices and configured for providing routing information to one or more FEs, said FE comprising:
a collection of router ports of a plurality of routing devices, each routing device comprising one or more line cards terminating multiple ports and a switching fabric for switching data traffic between said line cards; and
a forwarding information base (FIB) manager, for receiving route updates for a FIB via at least one of a dynamic binding protocol tunnel and a regular IP routing path, said FIB defining traffic routing associated with said FE within a data plane of a network;
said FE communicating with a primary CE and one or more backup CEs via respective dynamic binding protocol tunnels and regular IP routing paths, said FE being responsive to route updates received from the primary CE;
said FE, in response to an inability to communicate with the primary CE, selecting a backup CE to function as said primary CE,
wherein said FE is further configured to derive source routes to the CEs using advertisement or reachability messages, where said FE and at least one of the CEs are remotely located being separated by multiple hops, so that at least one of the CEs is configured to derive source routes to said FE using the received advertisement or reachability messages.

15. the forwarding element of claim 14, wherein said FIB manager comprises a Route Table Manager (RTM) proxy configured to collect route updates from each of a plurality of routing protocols in accordance with messages received from the primary CE.

* * * * *